US012600248B2

(12) United States Patent
Sumiya et al.

(10) Patent No.: US 12,600,248 B2
(45) Date of Patent: Apr. 14, 2026

(54) POWER RECEPTION APPARATUS WITH RELAY COILS ARRANGED ON TIRED WHEEL OF VEHICLE

(71) Applicants: DENSO CORPORATION, Kariya-city (JP); THE UNIVERSITY OF TOKYO, Tokyo (JP); BRIDGESTONE CORPORATION, Tokyo (JP)

(72) Inventors: Hayato Sumiya, Kariya-city (JP); Shimpei Takita, Kariya-city (JP); Kazuhiro Uda, Kariya-city (JP); Eisuke Takahashi, Kariya-city (JP); Nobuhisa Yamaguchi, Kariya-city (JP); Hiroshi Fujimoto, Tokyo (JP); Osamu Shimizu, Tokyo (JP); Yasumichi Wakao, Tokyo (JP); Isao Kuwayama, Tokyo (JP)

(73) Assignees: DENSO CORPORATION, Kariya (JP); THE UNIVERSITY OF TOKYO, Tokyo (JP); BRIDGESTONE CORPORATION, Tokyo (JP)

( * ) Notice: Subject to any disclaimer, the term of this patent is extended or adjusted under 35 U.S.C. 154(b) by 44 days.

(21) Appl. No.: 18/214,342

(22) Filed: Jun. 26, 2023

(65) Prior Publication Data

US 2023/0331102 A1 Oct. 19, 2023

Related U.S. Application Data

(63) Continuation of application No. PCT/JP2021/040091, filed on Oct. 29, 2021.

(30) Foreign Application Priority Data

Dec. 24, 2020 (JP) ................................. 2020-214578

(51) Int. Cl.
B60L 53/12 (2019.01)
H02J 50/50 (2016.01)

(52) U.S. Cl.
CPC .............. *B60L 53/12* (2019.02); *H02J 50/50* (2016.02)

(58) Field of Classification Search
CPC ...... B60L 53/12; B60L 2240/46; B60L 5/005; H02J 50/50; Y02T 10/70; Y02T 10/7072; Y02T 90/12; Y02T 90/14; B60M 7/00
See application file for complete search history.

(56) References Cited

U.S. PATENT DOCUMENTS 8,008,888 B2 8/2011 Oyobe et al.
2022/0302766 A1* 9/2022 Nakayashiki ........... B60L 53/30

FOREIGN PATENT DOCUMENTS

CN 104333145 A * 2/2015 ........... E01C 11/005
CN 105337334 A * 2/2016
(Continued)

*Primary Examiner* — Daniel Cavallari
(74) *Attorney, Agent, or Firm* — OLIFF PLC

(57) ABSTRACT

A power reception apparatus is installable in a vehicle and configured to receive electric power from a power transmission coil embedded in the ground. The power reception apparatus includes: a relay coil that is arranged on a tired wheel, which includes a tire and a wheel, and includes a first coil and a second coil; a power reception coil; and a power reception circuit. The first coil and the second coil are connected with each other by an electrical conductor. The first coil is arranged inside the tire. The second coil is located so that a distance from a central axis of the tired wheel to the second coil is shorter than a distance from the central axis to the first coil. The power reception coil is located so that when the first coil faces the power transmission coil, the power reception coil faces the second coil.

15 Claims, 47 Drawing Sheets

(56)　　　　　　　References Cited

FOREIGN PATENT DOCUMENTS

| CN | 105896694 | A | * | 8/2016 | ............... H02J 5/00 |
|----|-----------|---|---|--------|--------------------------|
| JP | 2004242380 | A | * | 8/2004 | |
| JP | 2012-157231 | A | | 8/2012 | |
| JP | 2014-195350 | A | | 10/2014 | |
| JP | 2016-220353 | A | | 12/2016 | |
| JP | 2017-093113 | A | | 5/2017 | |
| JP | 2019-161690 | A | | 9/2019 | |
| KR | 101217655 | B1 | * | 1/2013 | .............. H02J 50/12 |
| WO | WO-2021015253 | A1 | * | 1/2021 | ............ H02J 50/005 |

* cited by examiner

FIG.30
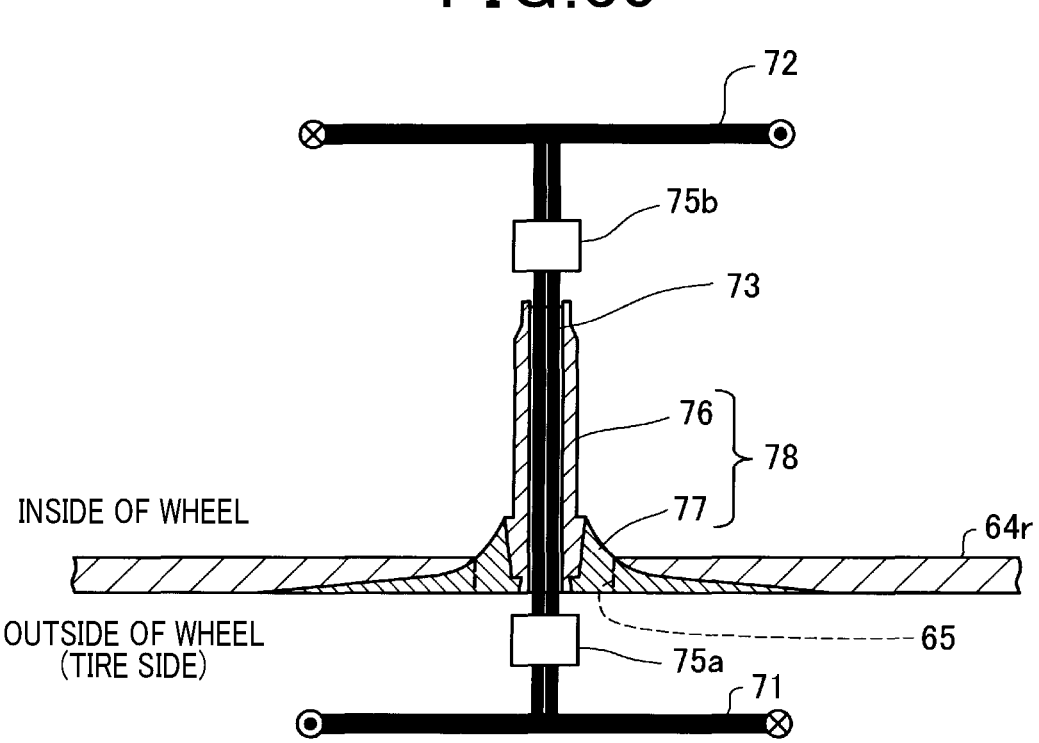
FIG.31
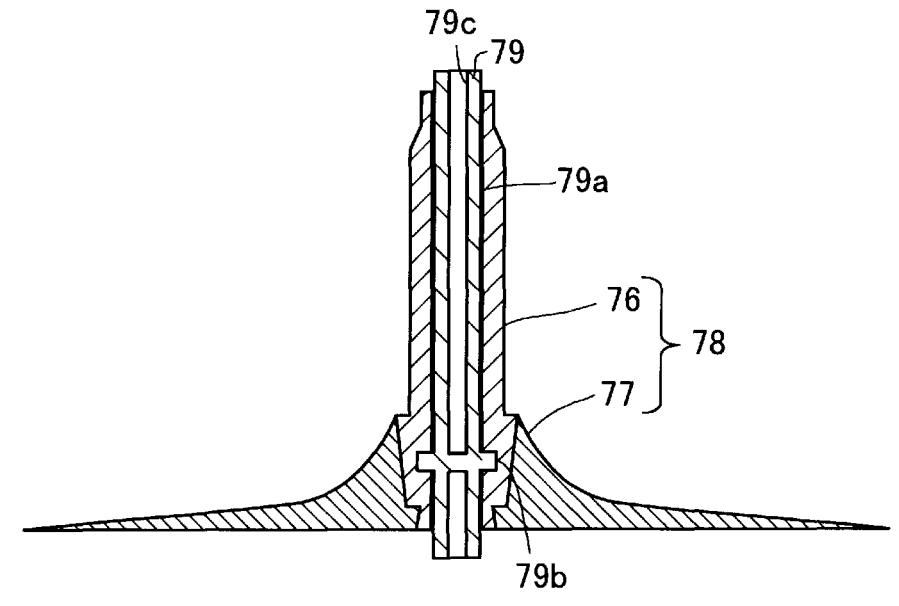

POWER RECEPTION APPARATUS WITH RELAY COILS ARRANGED ON TIRED WHEEL OF VEHICLE

CROSS-REFERENCE TO RELATED APPLICATIONS

The present application is a continuation application of International Application No. PCT/JP2021/040091 filed on Oct. 29, 2021, which is based on and claims priority from Japanese application No. 2020-214578 filed on Dec. 24, 2020. The entire contents of these applications are incorporated by reference into the present application.

BACKGROUND

1 Technical Field

The present disclosure relates to power reception apparatuses that receive electric power in stationary or traveling vehicles.

2 Description of Related Art

There is known a contactless power supply system for a traveling vehicle. In the contactless power supply system, electric power is transferred from a power transmission coil embedded in the ground to a power reception coil mounted to the underside of the vehicle.

SUMMARY

According to one aspect of the present disclosure, there is provided a power reception apparatus which is installable in a vehicle and configured to receive electric power from a power transmission coil embedded in the ground. The power reception apparatus includes: a relay coil that is arranged on a tired wheel, which includes a tire and a wheel, and includes a first coil and a second coil; a power reception coil; and a power reception circuit connected with the power reception coil. The first coil and the second coil are connected with each other by an electrical conductor. The first coil is arranged inside the tire. The second coil is arranged at a position such that a distance from a central axis of the tired wheel to the second coil is shorter than a distance from the central axis of the tired wheel to the first coil. The power reception coil is arranged at a position such that when the first coil faces the power transmission coil, the power reception coil faces the second coil.

It should be noted that the present disclosure can also be implemented in various forms other than the above power reception apparatus, such as a tire, a tired wheel, a power transfer system, a vehicle including the above power reception apparatus, and the like.

BRIEF DESCRIPTION OF THE DRAWINGS

FIG. 2 is an explanatory diagram illustrating the configuration of a tired wheel as viewed in a direction along a central axis of the tired wheel.

FIG. 8 is an explanatory diagram showing some of a plurality of first coils designated by indexed reference numerals.

FIG. 9 is a detail view illustrating an example of the assembled state of the tired wheel and a relay coil.

FIG. 16 is an explanatory diagram showing a power transmission coil and a power reception coil in a second reference example.

FIG. 19 is an explanatory diagram illustrating a first modification of the first embodiment.

FIG. 26 is an explanatory diagram illustrating an eighth modification of the first embodiment.

FIG. 30 is an explanatory diagram illustrating an eleventh modification of the first embodiment.

FIG. 31 is an explanatory diagram illustrating a twelfth modification of the first embodiment.

FIG. 43 is an explanatory diagram schematically illustrating the configuration of a tire.

FIG. 45A is an explanatory diagram showing a second layer of the tire.

DESCRIPTION OF EMBODIMENTS

Figure 1A:
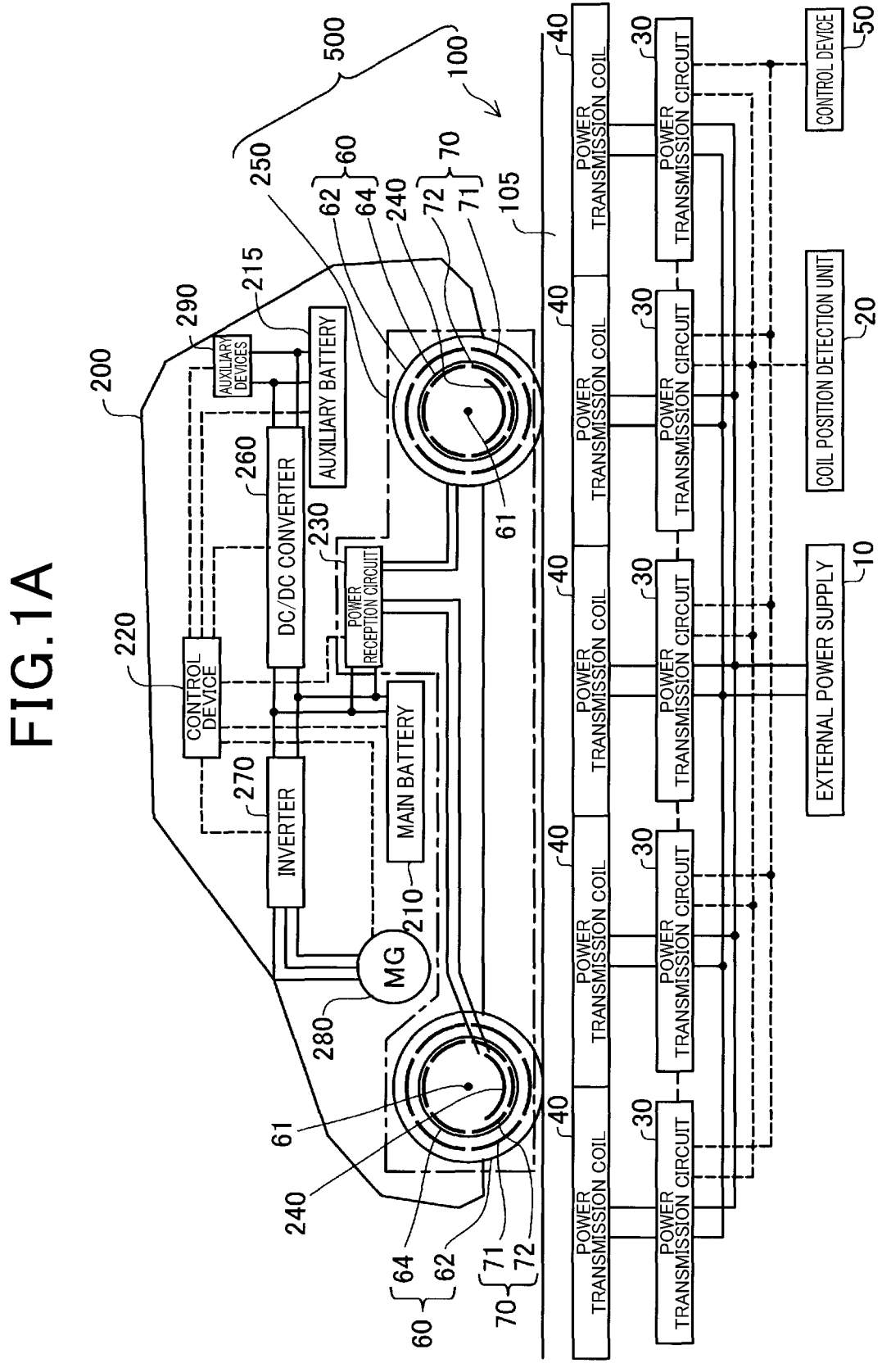
FIG. 1A is an explanatory diagram illustrating a power transfer system.

In the above-described contactless power supply system known in the art (see, for example, Japanese Patent Application Publication No. JP2016-220353A), it is difficult to improve the power transfer efficiency because the interval between the power transmission coil and the power reception coil is wide.

In contrast, with the configuration of the above-described power reception apparatus according to the present disclosure, both the interval between the power transmission coil and the first coil and the interval between the second coil and the power reception coil can be set to be narrow; thus, the power transfer efficiency can be improved.

Exemplary embodiments will be described hereinafter with reference to the drawings. It should be noted that for the sake of clarity and understanding, identical components having identical functions throughout the whole description have been marked, where possible, with the same reference numerals in the drawings and that for the sake of avoiding redundancy, descriptions of identical components will not be repeated.

First Embodiment

As shown in FIG. 1A, a power transfer system 500 includes a power transmission system 100 provided in a road 105 and a power reception apparatus 250 installed in a vehicle 200. The power transfer system 500 is a system capable of transferring electric power from the power transmission system 100 to the power reception apparatus 250 of the vehicle 200 when the vehicle 200 is in a stationary or traveling state. The vehicle 200 may be configured as, for example, an electric vehicle or a hybrid vehicle.

The power transmission system 100 on the road 105 side includes: a plurality of power transmission coils 40 embedded in the road 105; a plurality of power transmission circuits 30 for applying an AC voltage and thereby supplying electric power respectively to the power transmission coils 40; an external power supply 10 (to be simply referred as the "power supply 10" hereinafter) for supplying electric power to the power transmission circuits 30; a coil position detection unit 20; and a control device 50.

The power transmission coils 40 are installed along a traveling direction of the road 105. Each of the power transmission circuits 30 is a circuit that converts a DC voltage supplied from the power supply 10 into a high-frequency AC voltage and applies the high-frequency AC voltage to a corresponding one of the power transmission coils 40. The power transmission circuits 30 will be described in detail later. The power supply 10 is a circuit that supplies the DC voltage to the power transmission circuits 30. For example, the power supply 10 may supply electric power from a power grid to the power transmission circuits 30 via a Power Factor Correction (PFC) circuit. The PFC circuit is not shown in the drawings. In addition, the DC voltage outputted from the power supply 10 may not be a perfect DC voltage; that is, the DC voltage may include fluctuation (or ripple) to a certain extent.

The coil position detection unit 20 detects the positions of relay coils 70, which are mounted to tired wheels 60 of the vehicle 200, relative to the power transmission coils 40. For example, the coil position detection unit 20 may detect the positions of the relay coils 70 based on the magnitudes of the transmitted powers or transmitted currents in the power transmission circuits 30. Alternatively, the coil position detection unit 20 may detect the positions of the relay coils 70 via wireless communication with the vehicle 200 or using a position sensor that detects the position of the vehicle 200. According to the positions of the relay coils 70 detected by the coil position detection unit 20, the control device 50 causes one or more pairs of the power transmission circuits 30 and the power transmission coils 40 located near the relay coils 70 to transmit electric power.

The vehicle 200 includes a main battery 210, an auxiliary battery 215, a control device 220, a power reception circuit 230, power reception coils 240, a DC/DC converter circuit 260, an inverter circuit 270, a motor-generator 280, auxiliary devices 290, the tired wheels 60 and the relay coils 70. In the above configuration, the relay coils 70, the power reception coils 240 and the power reception circuit 230 together constitute the power reception apparatus 250. The relay coils 70 are provided on the tired wheels 60. Each of the tired wheels 60 includes a tire 62 and a wheel 64. In the first embodiment, each of the power reception coils 240 is provided inside the wheel 64 (i.e., on a central axis 61 side)

of a corresponding one of the tired wheels 60. The power reception circuit 230 is connected with the power reception coils 240. To an output side of the power reception circuit 230, there are connected the main battery 210, a higher-voltage side of the DC/DC converter circuit 260 and the inverter circuit 270. Further, to a lower-voltage side of the DC/DC converter circuit 260, there are connected the auxiliary battery 215 and the auxiliary devices 290. To the inverter circuit 270, there is connected the motor-generator 280.

Figure 1B:
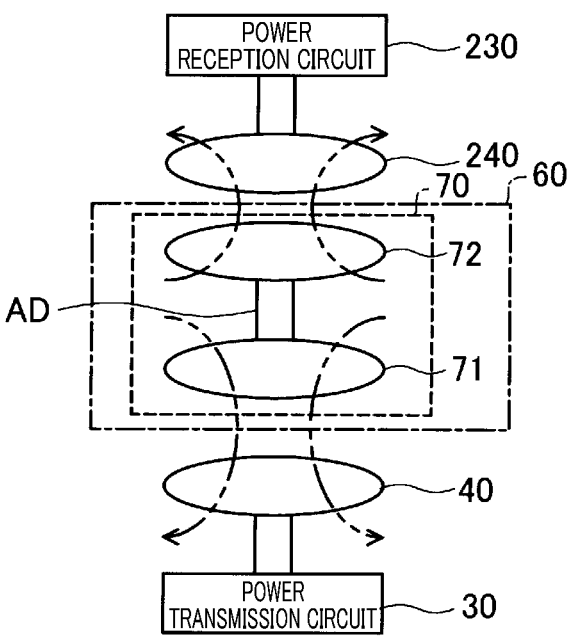
FIG. 1B is an explanatory diagram illustrating transfer of electric power from a power transmission circuit to a power reception circuit.

Each of the relay coils 70 is provided on a corresponding one of the tired wheels 60. Each of the relay coils 70 includes a first coil 71 and a second coil 72 that are connected with each other by electrical conductors 73. The first coil 71 is provided outside the wheel 64, i.e., on the tire 62 side in the corresponding tired wheel 60. On the other hand, the second coil 72 is provided inside the wheel 64 in the corresponding tired wheel 60. Therefore, the distance from the central axis 61 of the corresponding tired wheel 60 to the first coil 71 is different from the distance from the central axis 61 to the second coil 72, more specifically longer than the distance from the central axis 61 to the second coil 72. Consequently, the first coil 71 can be located closer than the second coil 72 to the power transmission coils 40 embedded in the road 105. When the corresponding tired wheel 60 rotates and thus the first coil 71 comes to face one of the power transmission coils 40 embedded in the road 105, AC current is induced in the first coil 71 by electromagnetic induction between the first coil 71 and the power transmission coil 40 because the AC voltage is applied to the power transmission coil 40. Moreover, the first coil 71 and the second coil 72 are connected in series with each other; therefore, the induced AC current flows from the first coil 71 to the second coil 72 through the electrical conductors 73. At this time, the power reception coil 240 provided on the corresponding tired wheel 60 faces the second coil 72 through which the induced AC current is flowing. As a result, AC current is induced in the power reception coil 240 by electromagnetic induction between the power reception coil 240 and the second coil 72. In this way, the relay coil 70 relays, with the first and second coils 71 and 72, transfer of electric power from the power transmission coil 40 to the power reception coil 240. That is, as shown in FIG. 1B, electric power is transferred from the power transmission circuit 30 to the power reception circuit 230 via the power transmission coil 40, the relay coil 70 (i.e., the first and second coils 71 and 72) and the power reception coil 240.

The power reception circuit 230 shown in FIG. 1A includes a rectifier circuit that rectifies the AC current outputted from the power reception coils 240 into DC current. In addition, the power reception circuit 230 may further include a DC/DC converter circuit for converting the DC voltage generated by the rectifier circuit into a DC voltage suitable for charging the main battery 210. The DC power outputted from the power reception circuit 230 can be used for charging the main battery 210 and for driving the motor-generator 280 via the inverter circuit 270. Moreover, the DC power outputted from the power reception circuit 230 can also be used, through a voltage step-down by the DC/DC converter circuit 260, for charging the auxiliary battery 215 and for driving the auxiliary devices 290.

The main battery 210 is a secondary battery that outputs a relatively high DC voltage for driving the motor-generator 280. The motor-generator 280 operates as a three-phase AC motor to generate a driving force for driving the vehicle 200 to travel. Otherwise, during deceleration of the vehicle 200, the motor-generator 280 operates as an electric generator to generate a three-phase AC voltage. Moreover, when the motor-generator 280 operates as a three-phase AC motor, the inverter circuit 270 converts the DC voltage outputted from the main battery 210 into a three-phase AC voltage and supplies the three-phase AC voltage to the motor-generator 280. Otherwise, when the motor-generator 280 operates as an electric generator, the inverter circuit 270 converts the three-phase AC voltage outputted from the motor-generator 280 into a DC voltage and supplies the DC voltage to the main battery 210.

The DC/DC converter circuit 260 converts the DC voltage outputted from the main battery 210 into a DC voltage suitable for driving the auxiliary devices 290 and supplies the resultant DC voltage to the auxiliary battery 215 and the auxiliary devices 290. The auxiliary battery 215 is a secondary battery that outputs a DC voltage for driving the auxiliary devices 290. The auxiliary devices 290 include peripheral devices, such as an air conditioner, an electric power steering device, a headlight, a direction indicator and a wiper of the vehicle 200, and various accessories of the vehicle 200. It should be noted that the DC/DC converter circuit 260 may not be provided in the vehicle 200.

The control device 220 controls each component in vehicle 200. When the vehicle 200 receives contactless power supply during traveling thereof, the control device 220 controls the power reception circuit 230 to receive the supplied electric power.

Figure 2:
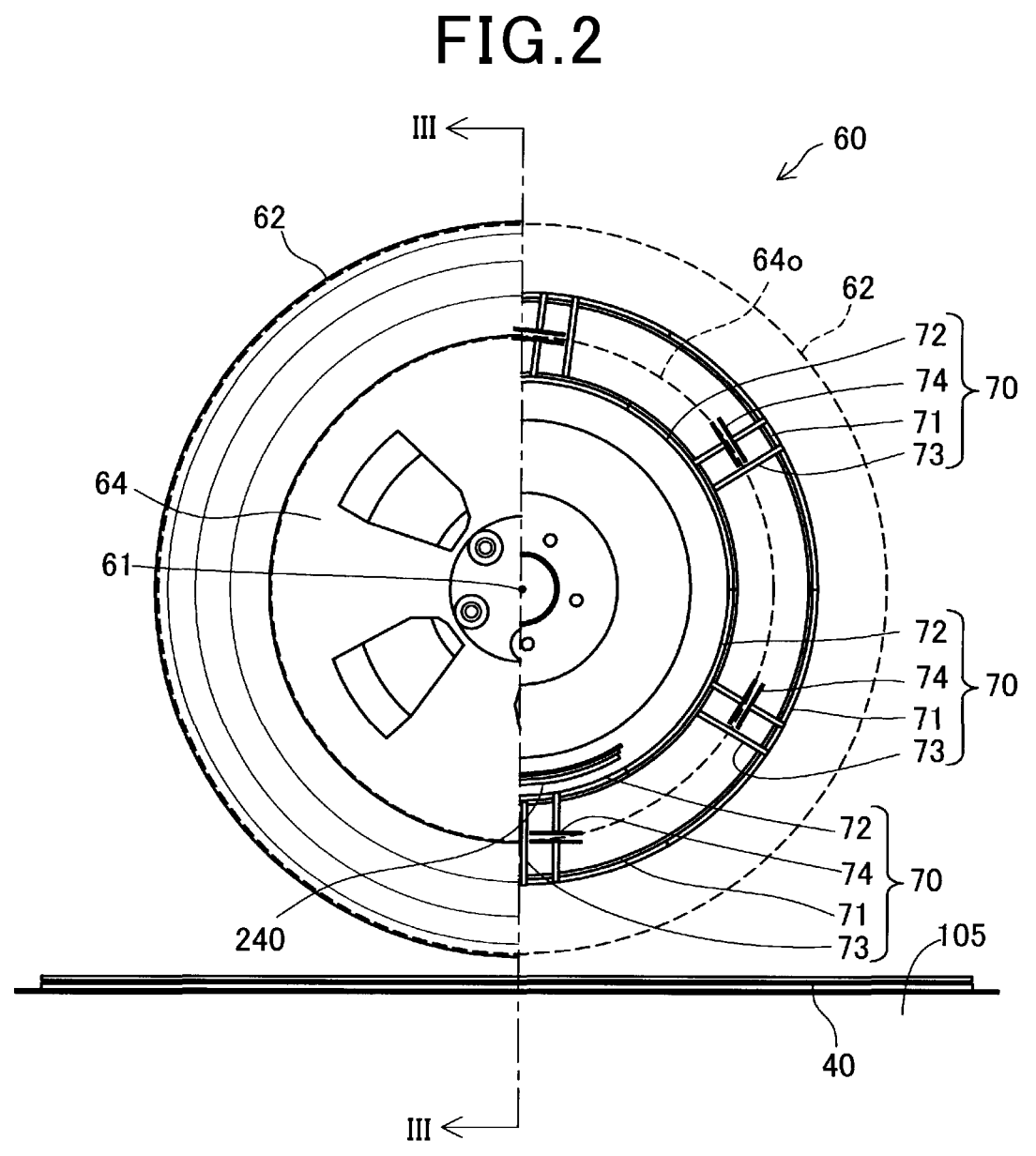

FIG. 2 is an explanatory diagram illustrating the configuration of each of the tired wheels 60 as viewed in a direction along the central axis 61 of the tired wheel 60. It should be noted that for the sake of facilitating understanding, the right half of FIG. 2 is shown as a perspective view and some components are illustrated using circuit symbols. As shown in FIG. 2, each of the relay coils 70 includes the first coil 71, the second coil 72, the electrical conductors 73 and a resonant capacitor 74. The first coil 71 is provided outside an outer periphery 64o of the wheel 64 and inside the tire 62. The second coil 72 is provided inside the outer periphery 64o of the wheel 64. The power reception coil 240 is located on the inner side of the outer periphery 64o of the wheel 64 in the vehicle 200. The power reception coil 240 is attached to the vehicle 200 in a similar manner to a brake caliper of a disc brake. Therefore, the relative position between the power reception coil 240 and the tired wheel 60 remains unchanged regardless of the traveling state of the vehicle 200.

In the first embodiment, each of the tired wheels 60 includes six relay coils 70, only some of which are shown in FIG. 2. That is, in each of the tired wheels 60, there are arranged six first coils 71 and six second coils 72. Any two adjacent first coils 71 do not overlap each other; and any two adjacent second coils 72 do not overlap each other. Accordingly, the size of the first coils 71 in the circumferential direction of the tired wheel 60 is slightly smaller than ⅙ of the circumference of the tired wheel 60 at the radial position where the first coils 71 are arranged; and the size of the second coils 72 in the circumferential direction of the tired wheel 60 is slightly smaller than ⅙ of the circumference of the tired wheel 60 at the radial position where the second coils 72 are arranged. Alternatively, any two adjacent first coils 71 may overlap each other; and any two adjacent second coils 72 may overlap each other. In each of the relay coils 70, the first coil 71, the second coil 72 and the resonant capacitor 74 are connected in series with each other by the electrical conductors 73 to form a closed circuit. That is, in the tired wheel 60, there are formed six closed circuits. In addition, the six relay coils 70 may be used in units of three relay coils to constitute three phases. In this case, the electrical conductors 73 can be partially shared between the relay coils 70.

Figure 3:
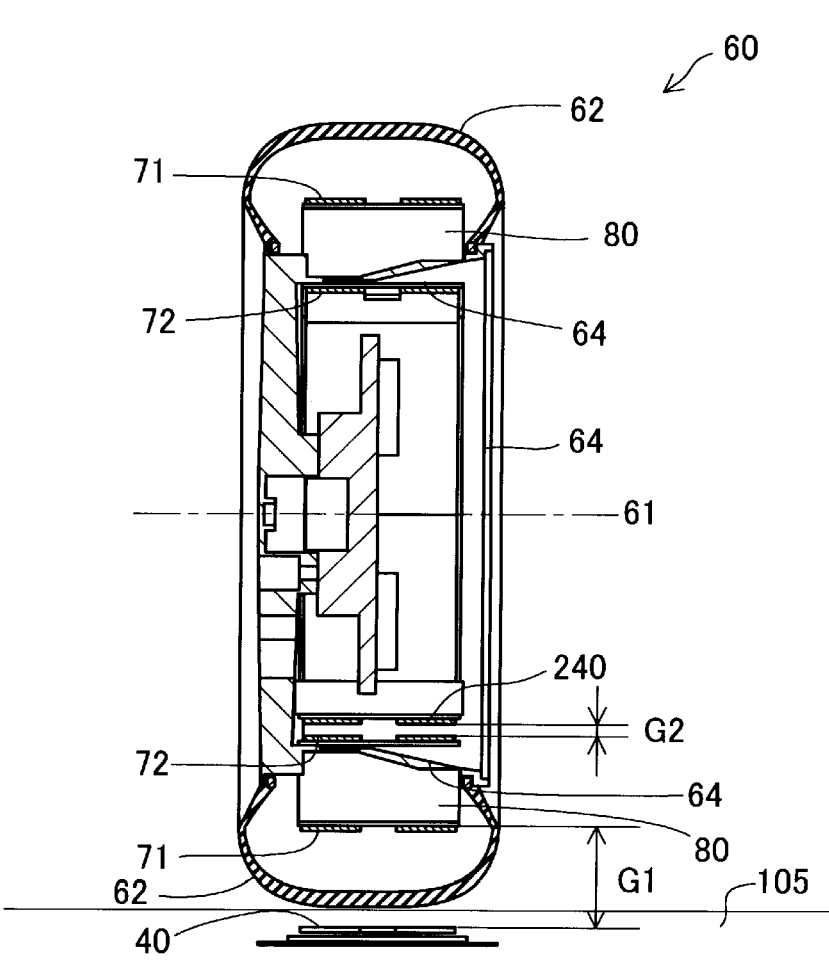
FIG. 3 is an explanatory diagram illustrating the internal configuration of the tired wheel in a cross section taken along the line in FIG. 2.

FIG. 3 is an explanatory diagram illustrating the configuration of each of the tired wheels 60 as viewed in a direction perpendicular to the central axis 61 of the tired wheel 60. It should be noted that part of FIG. 3 is shown as a perspective view. As shown in FIG. 3, in each of the relay coils 70, the first coil 71 is arranged inside the tire 62 and held by an internal member 80; the tire 62 is located on the outer side of the wheel 64. The internal member 80 is attached to an outer peripheral surface of the wheel 64. The details of the configuration of the internal member 80 will be described later. On the other hand, the second coil 72 is arranged inside the wheel 64. Moreover, the first and second coils 71 and 72 are located so that they overlap each other when viewed from the central axis 61. Furthermore, when viewed along an axis passing through both the first and second coils 71 and 72, the interval G2 between the second coil 72 and the power reception coil 240 is narrower than the interval G1 between the first coil 71 and the power transmission coil 40. As shown in FIG. 3, the tire 62 is in contact with the road 105 and thus deformed by irregularities of the road 105. If the first coil 71 was present in the deformed region, the first coil 71 would be affected by the deformation of the tire 62. Therefore, the interval G1 of a certain size is required between the first coil 71 and an outer edge of the tire 62. On the other hand, the relative position between the power reception coil 240 and the tired wheel 60 remains unchanged without being affected by irregularities of the road 105. Therefore, the interval G2 between the second coil 72 and the power reception coil 240 can be set to be narrow. In fact, the interval G2 between the second coil 72 and the power reception coil 240 is set to be narrower than the interval G1 between the first coil 71 and the power transmission coil 40. Setting the interval G2 between the second coil 72 and the power reception coil 240 to be narrow, the efficiency of electric power transfer from the second coil 72 to the power reception coil 240 can be improved.

Figure 4:
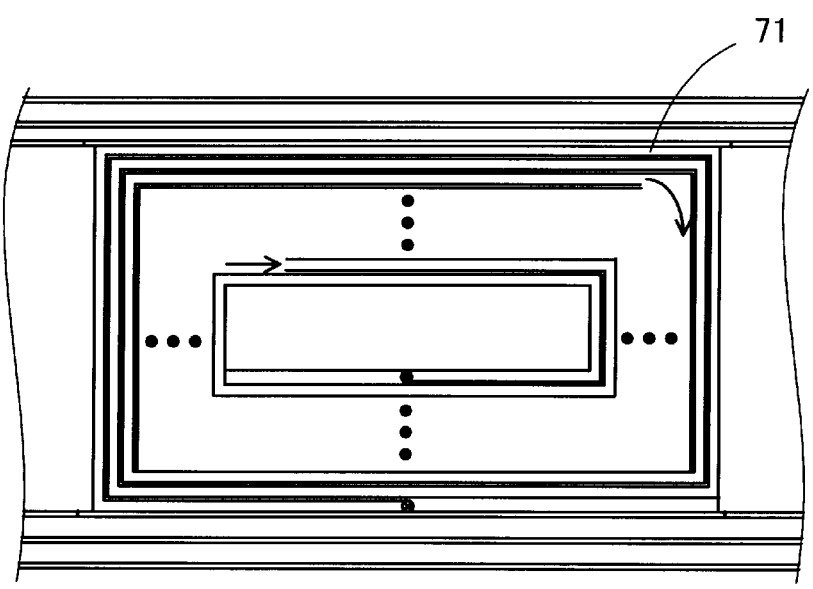
FIG. 4 is an explanatory diagram schematically showing a first coil in a state of being viewed from the central axis of the tired wheel.
Figure 5:
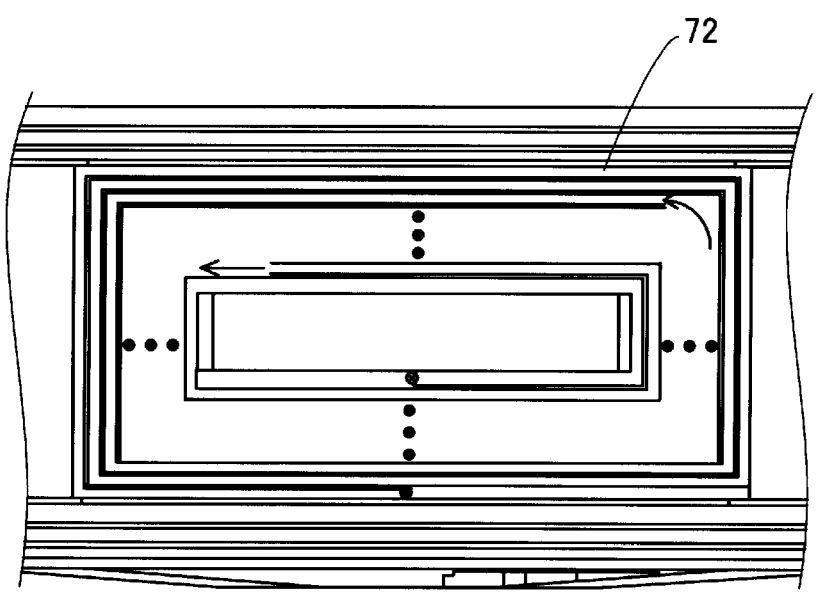
FIG. 5 is an explanatory diagram schematically showing a second coil in a state of being viewed from the central axis of the tired wheel.

FIG. 4 is a diagram showing the first coil 71 viewed from the central axis 61 of the tired wheel 60. FIG. 5 is a diagram showing the second coil 72 viewed from the central axis 61 of the tired wheel 60. It should be noted that: illustration of the first coil 71 is partially omitted from FIG. 4; and illustration of the second coil 72 is partially omitted from FIG. 5. As shown in FIGS. 4 and 5, each of the first and second coils 71 and 72 is spirally wound. The number of turns of the first coil 71 and the number of turns of the second coil 72 are determined based on desired values of the inductances of the first coil 71 and the second coil 72. More particularly, in the first embodiment, the number of turns of the first coil 71 and the number of turns of the second coil 72 are set to be about 5 to 10 turns. Moreover, when clockwise induced current as viewed from the central axis 61 flows through the first coil 71 as shown in FIG. 4, counterclockwise induced current as viewed from the central axis 61 flows through the second coil 72 as shown in FIG. 5. Conversely, when counterclockwise induced current as viewed from the central axis 61 flows through the first coil 71, clockwise induced current as viewed from the central axis 61 flows through the second coil 72. Since the first and second coils 71 and 72 are located so that they overlap each other when viewed from the central axis 61, magnetic fields generated by the currents respectively flowing through the first and second coils 71 and 72 can cancel each other out, thereby suppressing leakage electromagnetic fields.

Figure 6:
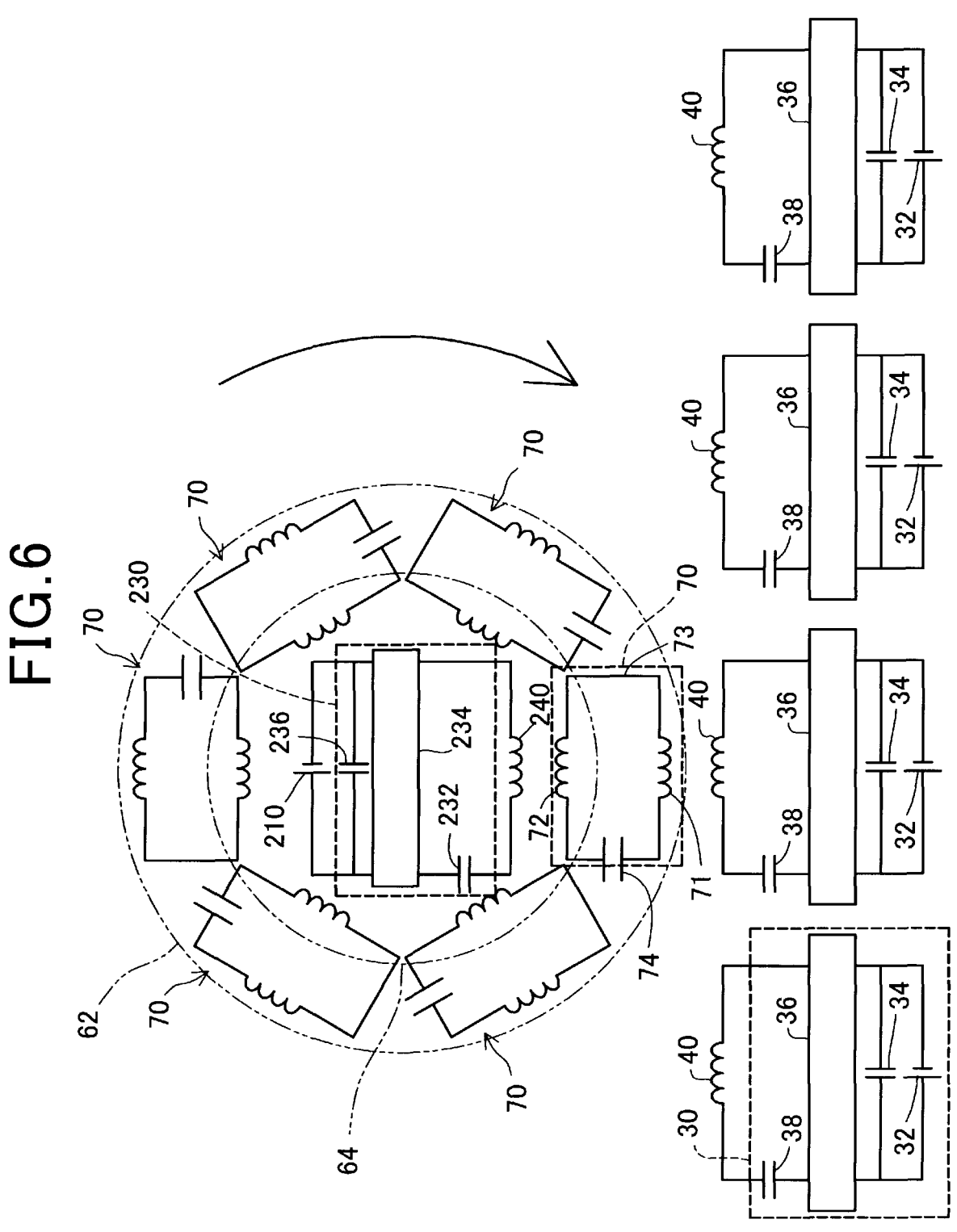
FIG. 6 is a schematic circuit diagram illustrating the electrical configuration of the power transfer system.

FIG. 6 is a schematic circuit diagram illustrating the electrical configuration of the power transfer system 500. As shown in FIG. 6, each of the power transmission circuits 30 includes a power supply 32, a smoothing capacitor 34, an inverter 36 and a resonant capacitor 38. The power supply 32 is a power supply provided by the external power supply 10, which is referred to as the power supply 32 for convenience. In the first embodiment, an SS method is used in which the power transmission coil 40 and the resonant capacitor 38 are connected in series with each other. It should be noted that instead of the SS method, a PP method or an LCC method may be used. In the PP method, the power transmission coil 40 and the resonant capacitor 38 are connected in parallel with each other. In the LCC method, the power transmission coil 40 has both a resonant capacitor connected in series therewith and a resonant capacitor connected in parallel therewith. In addition, in the relay coils 70, it is preferable to use the same method as used in the power transmission circuits 30.

As shown in FIG. 6, in the present embodiment, in each of the tired wheels 60, six relay coils 70 are arranged along the circumferential direction of the tired wheel 60. As described above, each of the relay coils 70 includes the first coil 71, the second coil 72 and the resonant capacitor 74, which are connected in series with each other by the electrical conductors 73. It should be noted that in each of the tired wheels 60, there may be provided only one relay coil 70 or a plurality of relay coils 70; i.e., the number of the relay coils 70 provided in each of the tired wheels 60 may be arbitrarily set.

In the case of using the SS method, the resonant frequency f1 of the power transmission coil 40 can be expressed by the following equation:

$$f1 = 1/(2\pi(L1 \cdot C1)^{(1/2)}),$$

where C1 is the capacitance of the resonant capacitor 38, and L1 is the inductance of the power transmission coil 40 when the power transmission coil 40 faces the first coil 71.

The inductance La of each of the relay coils 70 is the resultant inductance of the first and second coils 71 and 72 of the relay coil 70, which can be expressed by the following equation:

$$La = L71 + L72 \pm 2Ma,$$

where L71 is the inductance of the first coil 71, L72 is the inductance of the second coil 72, and Ma is the mutual inductance between the first and second coils 71 and 72. Moreover, in the above equation, the sign "±" before the mutual inductance Ma is "+" when the winding directions of the first and second coils 71 and 72 are the same, and is "−" when the winding directions of the first and second coils 71 and 72 are opposite to each other. In addition, the inductance L71 of the first coil 71 depends on the position of the first coil 71 relative to the power transmission coil 40; and the inductance L72 of the second coil 72 depends on the position of the second coil 72 relative to the power reception coil 240. Therefore, the inductances L71, L72 and La change according to the phase of the tired wheel 60.

The capacitance C2 of the resonant capacitor 74 of each of the relay coils 70 is set to a value such that the first coil 71 resonates at the same frequency as the resonant frequency f1 of the power transmission coil 40 when the power transmission coil 40 and the first coil 71 face each other and thus are most coupled with each other. Accordingly, the following equation is satisfied:

$$f1=1/(2\pi(La\cdot C2)\hat{}(\frac{1}{2})),$$

where La is the inductance of each of the relay coils 70 as described above.

The power reception circuit 230 includes a resonant capacitor 232, a rectifier circuit 234 and a smoothing capacitor 236. The capacity C3 of the resonant capacitor 232 is set so that the power reception coil 240 resonates at the resonant frequency f1 of the power transmission coil 40 and the first coil 71. Accordingly, the following equation is satisfied:

$$f1=1/(2\pi(L2\cdot C3)\hat{}(\frac{1}{2})),$$

where L2 is the inductance of the power reception coil 240 when the power reception coil 240 faces the second coil 72 of the relay coil 70.

When each of the tired wheels 60 rotates, the relay coils 70 provided on the tired wheel 60 also rotate so that the first coil 71 facing the road 105 is successively switched and the power transmission coil 40 facing the first coil 71 is also successively switched. Moreover, the second coil 72 facing the power reception coil 240 is also successively switched.

Figure 7:
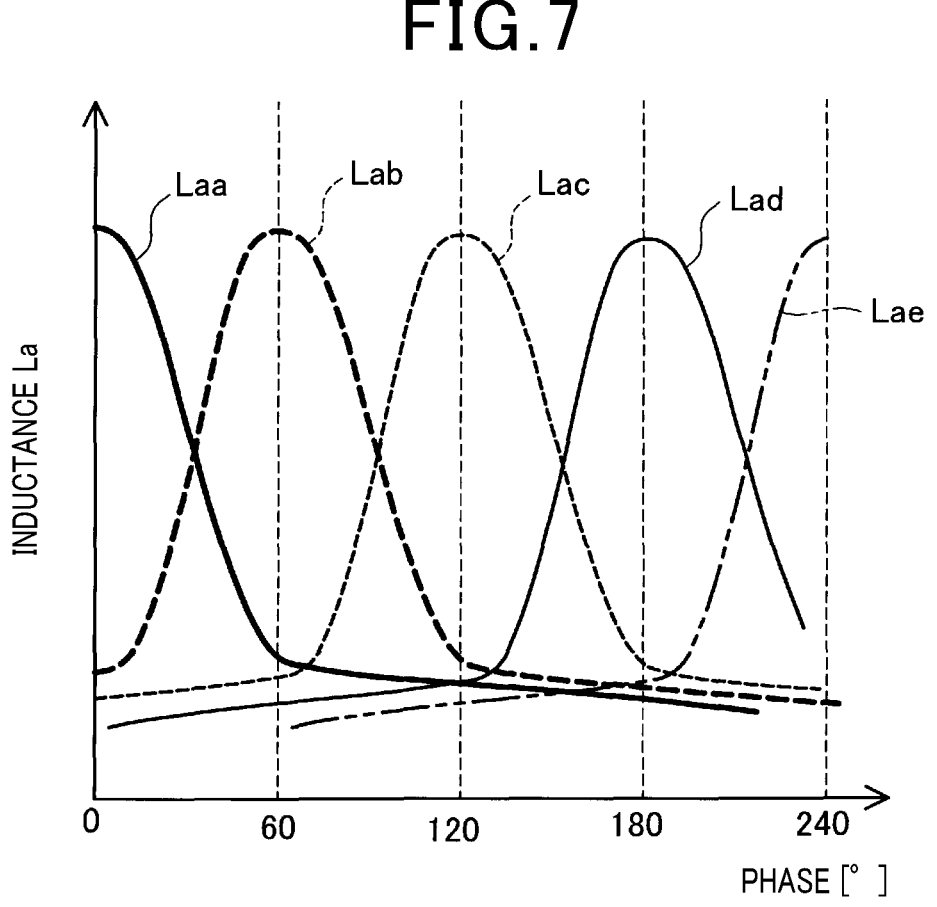
FIG. 7 is an explanatory diagram illustrating the relationship between the phase of the tired wheel and resultant inductances.
Figure 8:
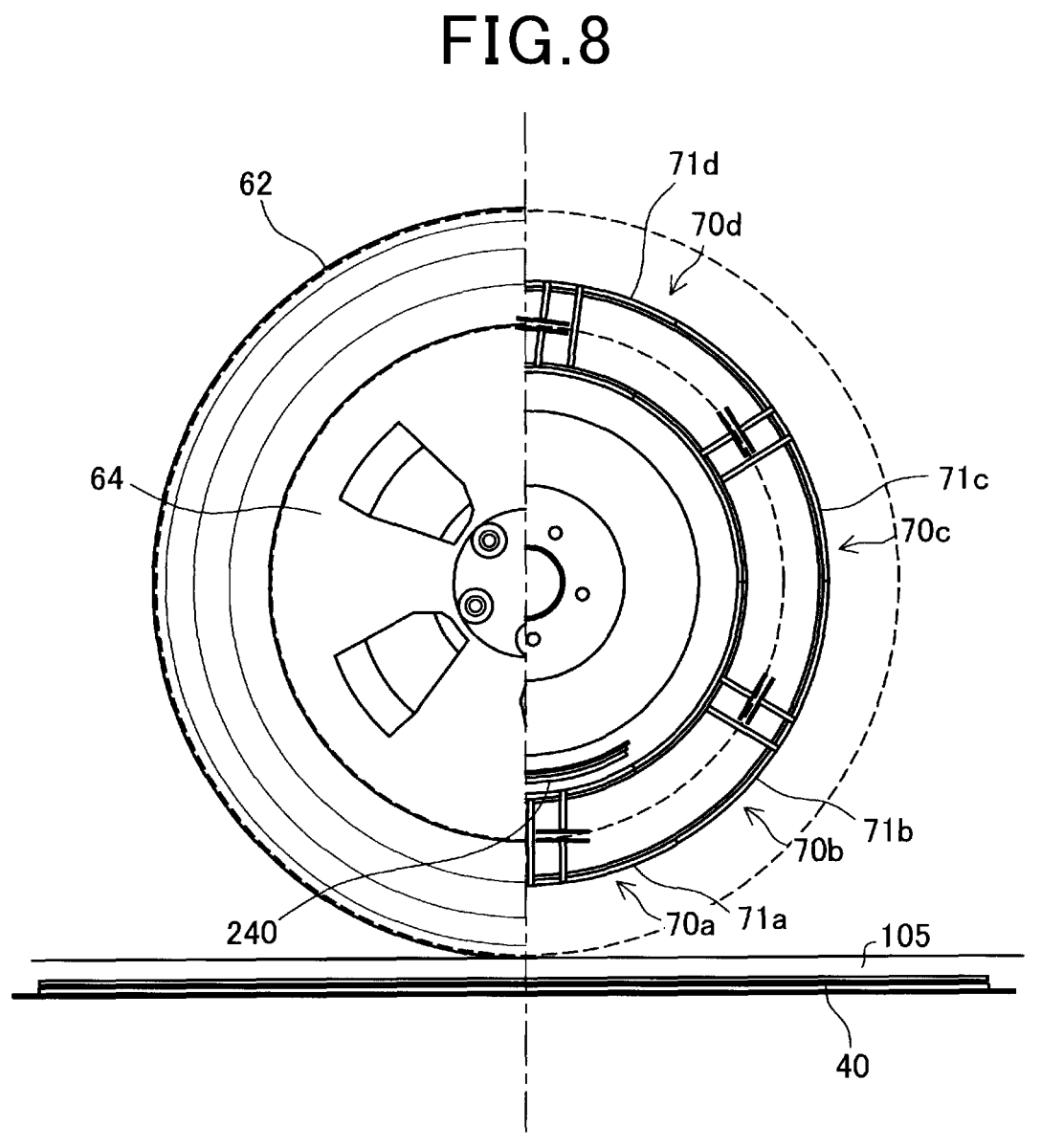

FIG. 7 is an explanatory diagram illustrating the relationship between the phase of one of the tired wheels 60 and the resultant inductances La of the relay coils 70 provided on the tired wheel 60. In FIG. 8, indexed reference numerals are used to distinguish the first coils 71 of the relay coils 70. In each of the relay coils 70, the resultant inductance La of the relay coil 70 becomes highest when the first coil 71 of the relay coil 70 faces one of the power transmission coils 40. For example, at the phase of 0°, the first coil 71a of the relay coil 70a faces the power transmission coil 40 and thus the resultant inductance Laa of the relay coil 71a becomes highest. Similarly, at the phase of 60°, the first coil 71b of the relay coil 70b faces the power transmission coil 40 and thus the resultant inductance Lab of the relay coil 70b becomes highest. At the phase of 120°, the first coil 71c of the relay coil 70c faces the power transmission coil 40 and thus the resultant inductance Lac of the relay coil 70c becomes highest. At the phase of 180°, the first coil 71d of the relay coil 70d faces the power transmission coil 40 and thus the resultant inductance Lad of the relay coil 70d becomes highest. That is, in the relay coils 70a, 70b, 70c and 70d, the resultant inductance La becomes highest and the first coil 71 and the power transmission coil 40 are most coupled with each other respectively at the phase of 0°, the phase of 60°, the phase of 120° and the phase of 180°.

Similarly, when the power reception coil 240 is located at a position where it faces the second coil 72 of one of the relay coils 70, the inductances of the power reception coil 240 and the relay coil 70 become highest.

In each of the relay coils 70, when the first coil 71 faces one of the power transmission coils 40, if the power reception coil 240 is located at a position where it faces the second coil 72, both the coupling coefficient ka between the power transmission coil 40 and the first coil 71 and the coupling coefficients kb between the second coil 72 and the power reception coil 240 can be maximized, thereby improving the efficiency of electric power transfer from the power transmission coil 40 to the power reception coil 240 via the relay coil 70.

Figure 9:
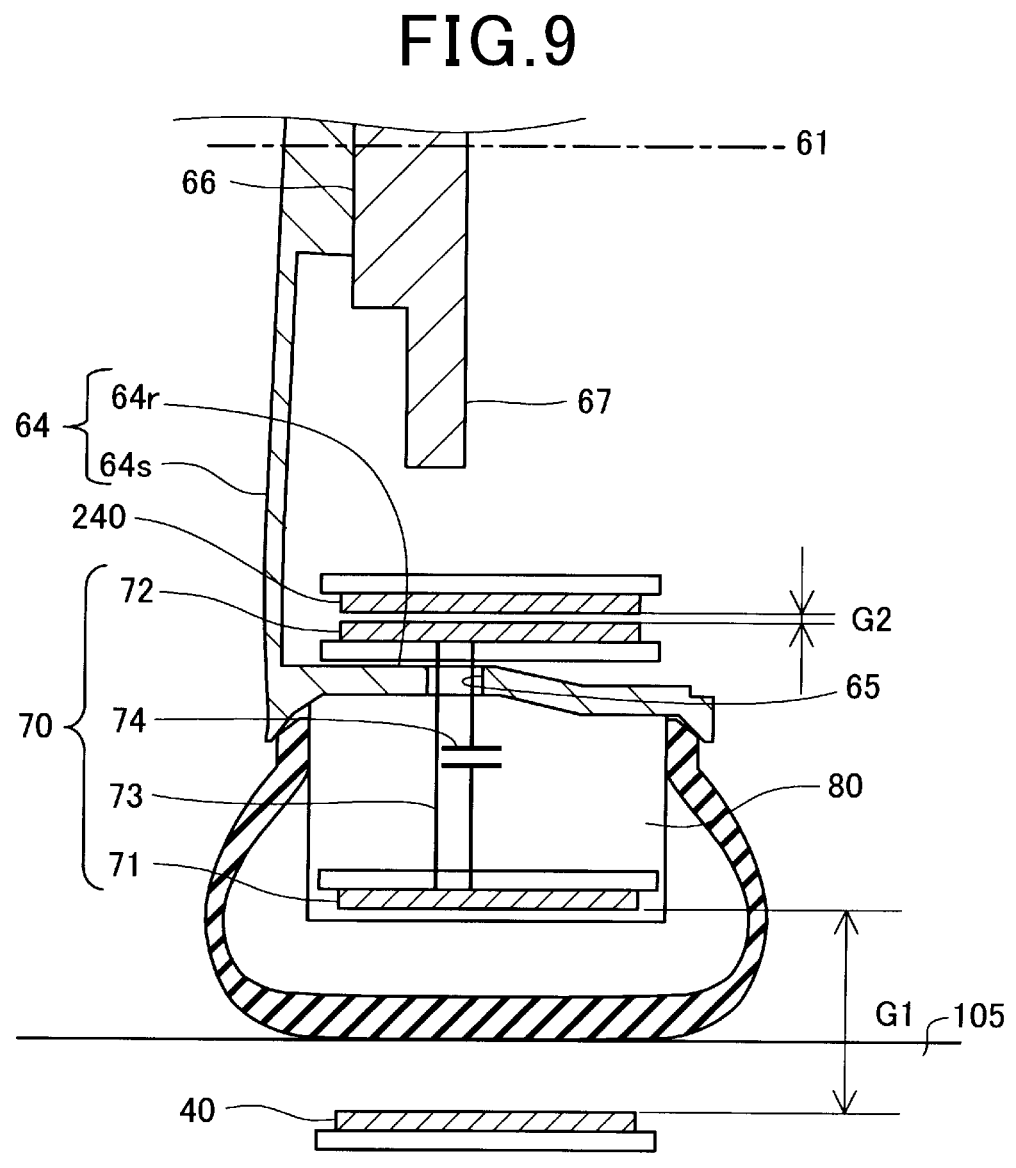

FIG. 9 is a detail view illustrating the configurations of the tired wheels 60 and the relay coils 70. As shown in FIG. 9, in each of the tired wheels 60, the wheel 64 has a rim 64r and spokes 64s. The rim 64r is a substantially cylindrical part of the wheel 64. The tire 62 is mounted on an outer periphery of the rim 64r. The spokes 64s are formed of a substantially discoid member provided at one end of the rim 64r. The spokes 64s are fixed to a hub 66 of the vehicle 200. That is, the tired wheel 60 is attached to the hub 66. A brake disc 67 of a disc brake is also attached to the hub 66. It should be noted that in FIG. 9 and subsequent figures illustrating the configurations of the tired wheels 60 and the relay coils 70, the coils 40, 71, 72 and 240 are schematically shown by hatched rectangles and support bases holding these coils are schematically shown by blanked rectangles. The support bases may have any shape such that they can fix these coils at desired positions. Moreover, the shape and material of the support bases are set so that no loss or only low loss is caused in the support bases by magnetic fields generated by these coils.

In each of the relay coils 70, the first coil 71 is provided outside the rim 64r of the wheel 64 and at an outer peripheral portion of the internal member 80 that is provided inside the tire 62. Here, the term "internal member" denotes a member that is placed inside another member for creating an internal structure. More particularly, in the present embodiment, the internal member 80 denotes an insert member that is inserted in the tire 62. The internal member 80 may be formed of, for example, a resin. The first coils 71 of the relay coils 70 are mounted to the outer peripheral portion of the internal member 80. The internal member 80 may have either a solid structure or a hollow frame structure. The internal member 80 is attached to an outer peripheral surface of the rim 64r of the wheel 64. Moreover, in each of the relay coils 70, the second coil 72 is arranged inside the rim 64r of the wheel 64. The electrical conductors 73 extend through a through-hole 65, which is formed in the rim 64r of the wheel 64, to connect the first coil 71 located outside the rim 64r and the second coil 72 located inside the rim 64r. The through-hole 65 is sealed to ensure airtightness of the tire 62. The seal structure of the through-hole 65 will be described later. In the first embodiment, the resonant capacitor 74 is provided in the internal member 80 and held by the internal member 80.

Figure 10:
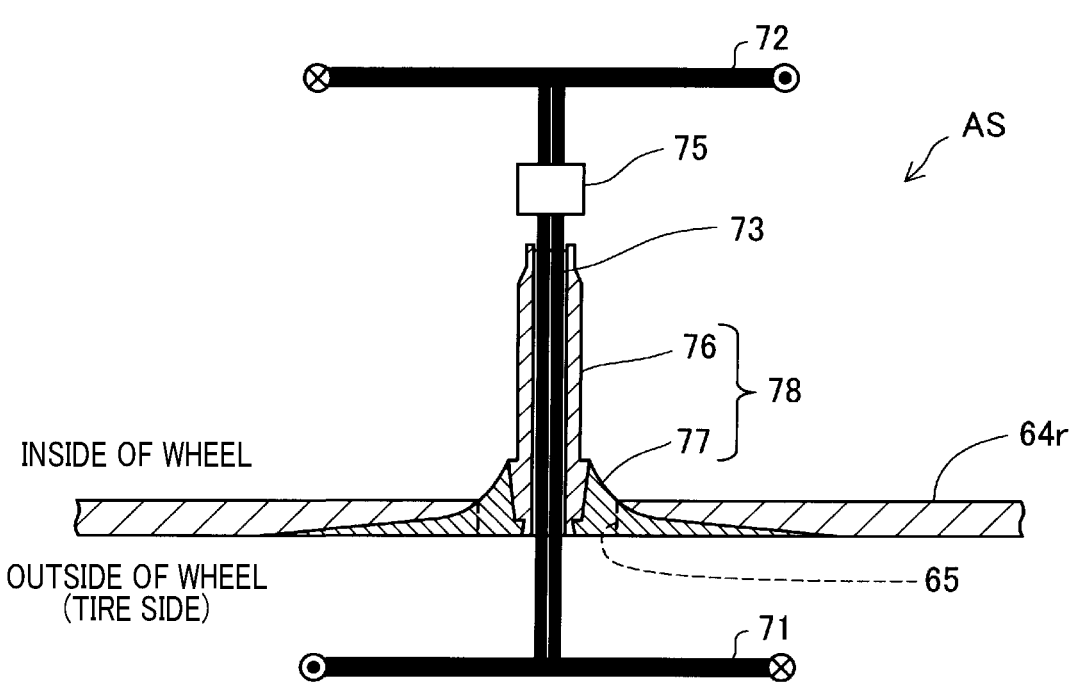
FIG. 10 is an explanatory diagram illustrating the configurations of electrical conductors, which connect the first and second coils, and a rim of a wheel.
Figure 11:
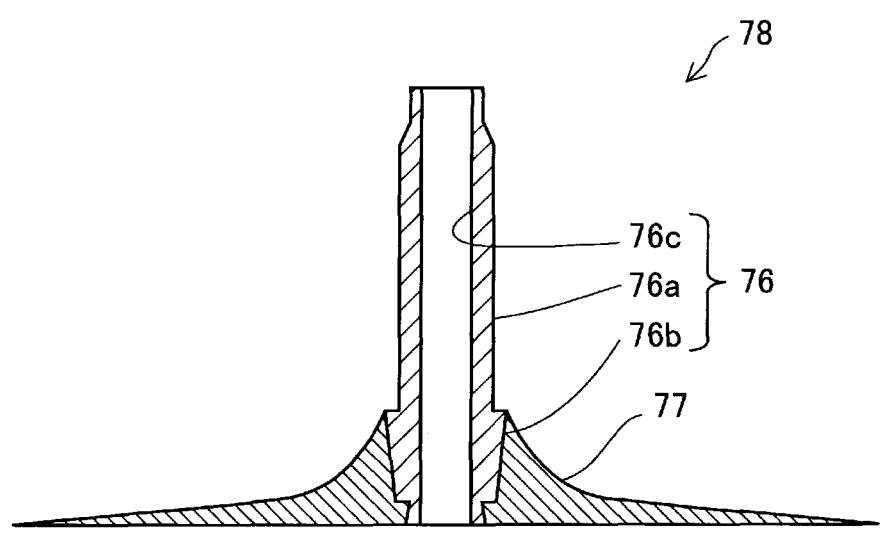
FIG. 11 is an explanatory diagram illustrating the configuration of a hermetic seal.

FIG. 10 is an explanatory diagram illustrating an example of a structure AS for electrically connecting the first coil 71 provided inside the tire 62 and the second coil 72 provided outside the tire 62 and inside the wheel 64. In the present embodiment, the first coil 71 and the second coil 72 are connected with each other by the electrical conductors 73. The resonant capacitor 74 is arranged outside the rim 64r of the wheel 64, but not shown in FIG. 10. A hermetic seal 78 is arranged in the through-hole 65 of the rim 64r to seal the through-hole 65 so as to prevent leakage of air from the inside of the tire 62. As shown in FIG. 11, the hermetic seal 78 includes a valve 76 and a seal 77. The valve 76 has a tubular portion 76a, a flange 76b provided on an outer periphery of the tubular portion 76a, and a through-hole 76c penetrating the tubular portion 76a. The seal 77 is pressed against the rim 64r by the pressure inside the tire 62. As shown in FIG. 10, the seal 77 seals the gap between the through-hole 65 of the rim 64r and the valve 76 to maintain airtightness of the tire 62. The electrical conductors 73 extend through the through-hole 76c.

Figure 12:
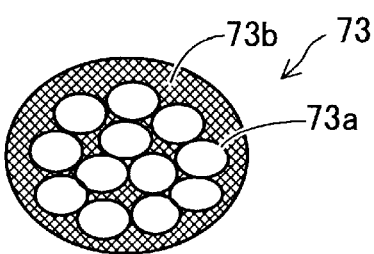
FIG. 12 is an explanatory diagram illustrating the configuration of each of the electrical conductors in a cross section.

As shown in FIG. 12, each of the electrical conductors 73 is formed of a litz wire that is obtained by twisting a bundle of a number of thin electrical conductors 73a. The skin effect can be reduced by forming each of the electrical conductors 73 with the litz wire in which the thin electrical conductors 73a are twisted together. The thin electrical conductors 73a are impregnated with a resin 73b. The electrical conductors 73 impregnated with the resin 73b extend through the through-hole 76c of the valve 76. The resin 73b seals the through-hole 76c to maintain airtightness of the tire 62.

Figure 13:
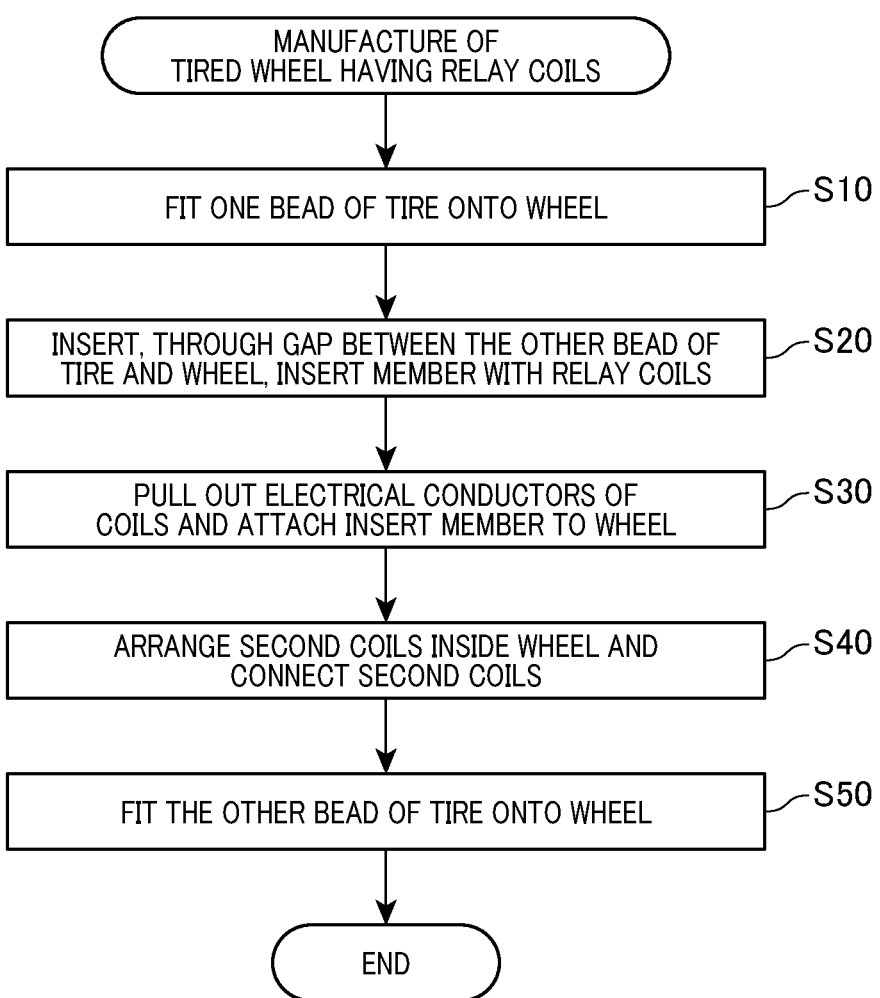
FIG. 13 is a flowchart illustrating an example of the process of assembling relay coils to a tire and the wheel.
Figure 14:
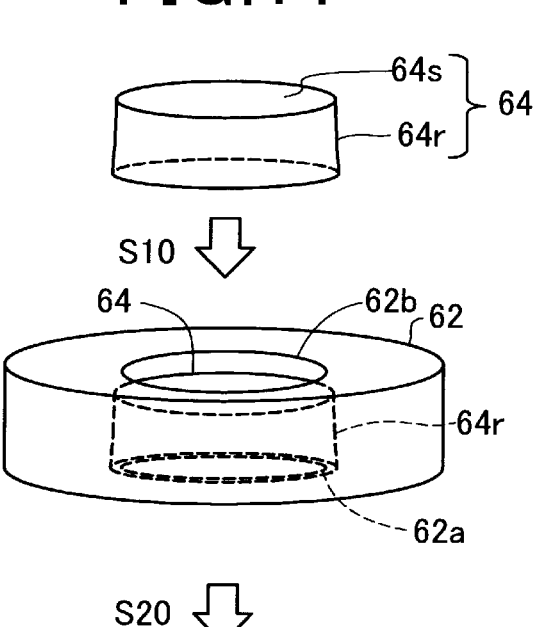
FIG. 14 is an explanatory diagram schematically illustrating the process of assembling the relay coils to the tire and the wheel.
Figure 14:
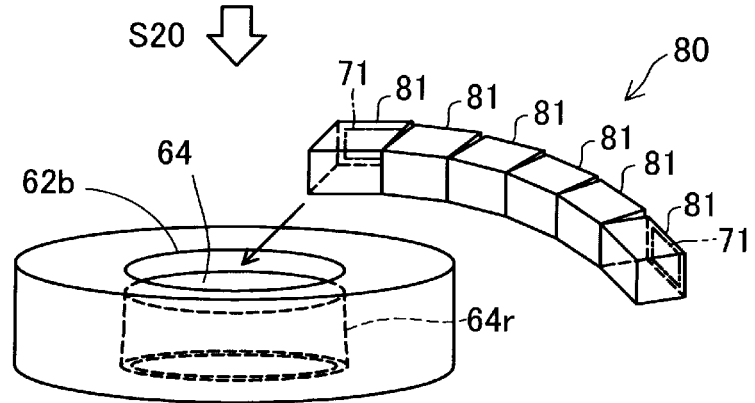
Figure 14:
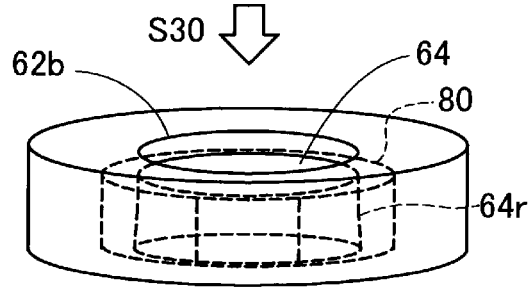
Figure 14:
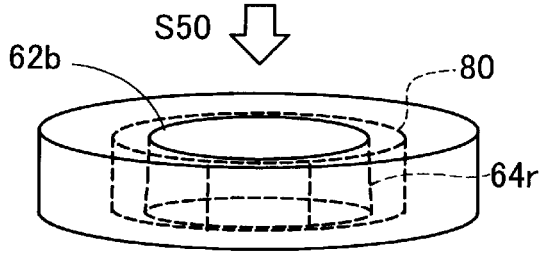

Hereinafter, the assembly of the relay coils 70 to the tired wheel 60 will be described. FIG. 13 is a flowchart illustrating the process of assembling the relay coils 70 to the tire 62 and the wheel 64. FIG. 14 is an explanatory diagram illustrating the process of assembling the relay coils 70 to the tire 62 and the wheel 64. In step S10, a worker fits one bead 62a of the tire 62 onto the wheel 64. At this time, as shown in FIG. 14, a gap is formed between the other bead 62b of the tire 62 and the wheel 64. The beads 62a and 62b are ring-shaped members provided respectively at two circular openings of the tire 62. The beads 62a and 62b have a function of fixing the tire 62 to the rim 64r of the wheel 64 when the tire 62 is inflated. The beads 62a and 62b have a structure in which: steel wires called bead wires are bundled and formed into the ring shape; and the bead wires are covered with rubber.

In step S20, the worker inserts the internal member 80 into the tire 62 through the gap between the other bead 62b of the tire 62 and the wheel 64. As shown in FIG. 14, before being installed on the tired wheel 60, the internal member 80 has a shape such that a plurality of small blocks 81 are linearly connected. Although the first coils 71 are illustrated only in the two blocks 81 located respectively at the two ends of the internal member 80 in FIG. 14, all the blocks 81 have the respective first coils 71 arranged therein. The length of the internal member 80 is substantially equal to the circumference of the rim 64r of the wheel 64.

In step S30, after inserting the internal member 80 into the tire 62, the worker pulls out the electrical conductors 73 of the relay coils 70 from the through-holes 65 formed in the wheel 64 to the inside of the wheel 64 and attaches all the blocks 81 to the outer peripheral surface of the rim 64r of the wheel 64. Consequently, the internal member 80 is arranged in an annular shape along the outer periphery of the rim 64r. It should be noted that the worker may first perform either one of the pulling out of the electrical conductors 73 from the through-holes 65 and the attaching of the blocks 81 to the wheel 64 and then perform the other.

In step S40, the worker arranges the second coils 72 of the relay coils 70 inside the wheel 64 and connects the electrical conductors 73 and the second coils 72 using connectors 75. In step S50, the worker fits the other bead 62b of the tire 62 onto the wheel 64. It should be noted that the worker may first perform either one of steps S40 and S50 and then perform the other.

Figure 15:
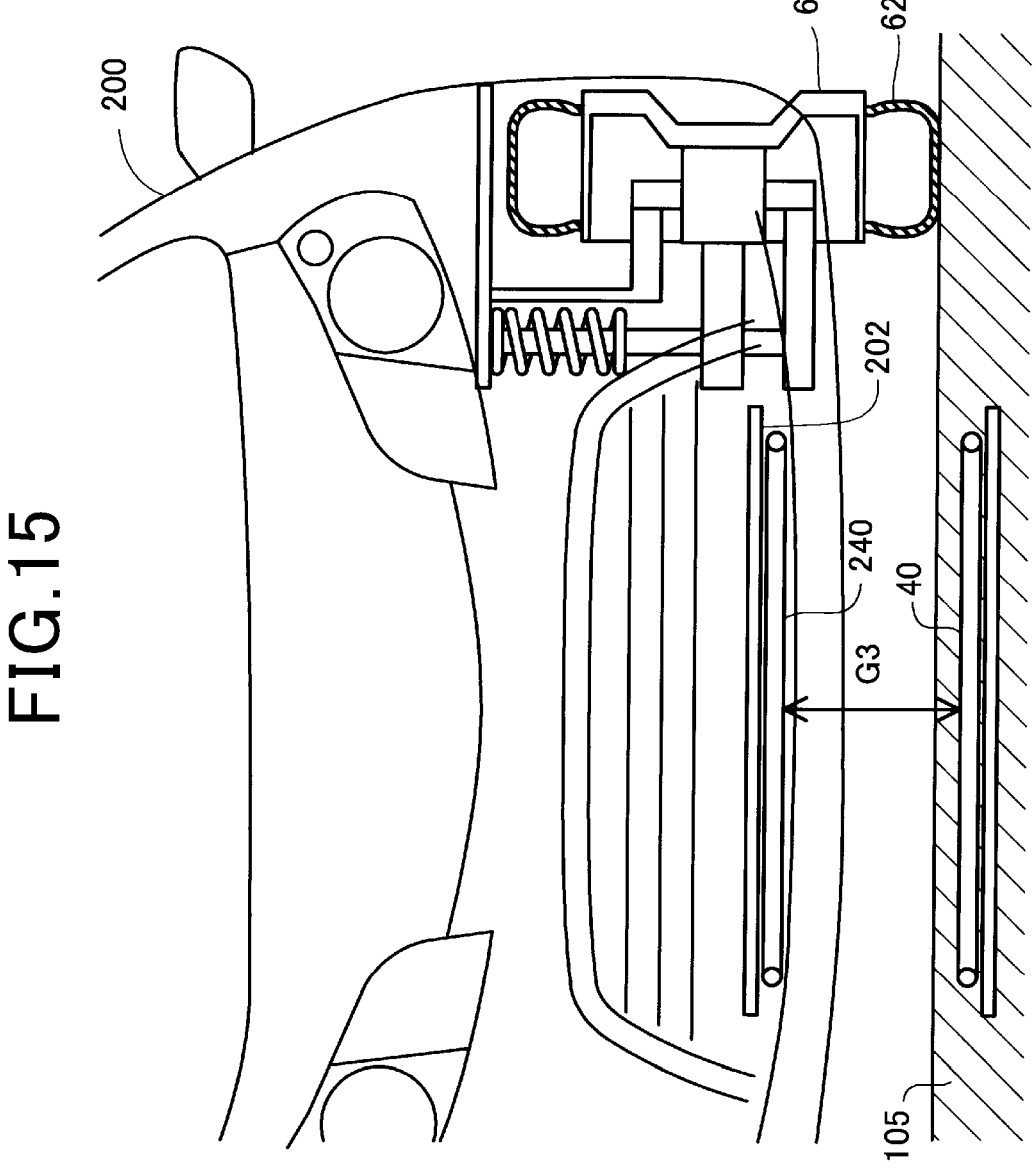
FIG. 15 is an explanatory diagram showing a power transmission coil and a power reception coil in a first reference example.
Figure 16:
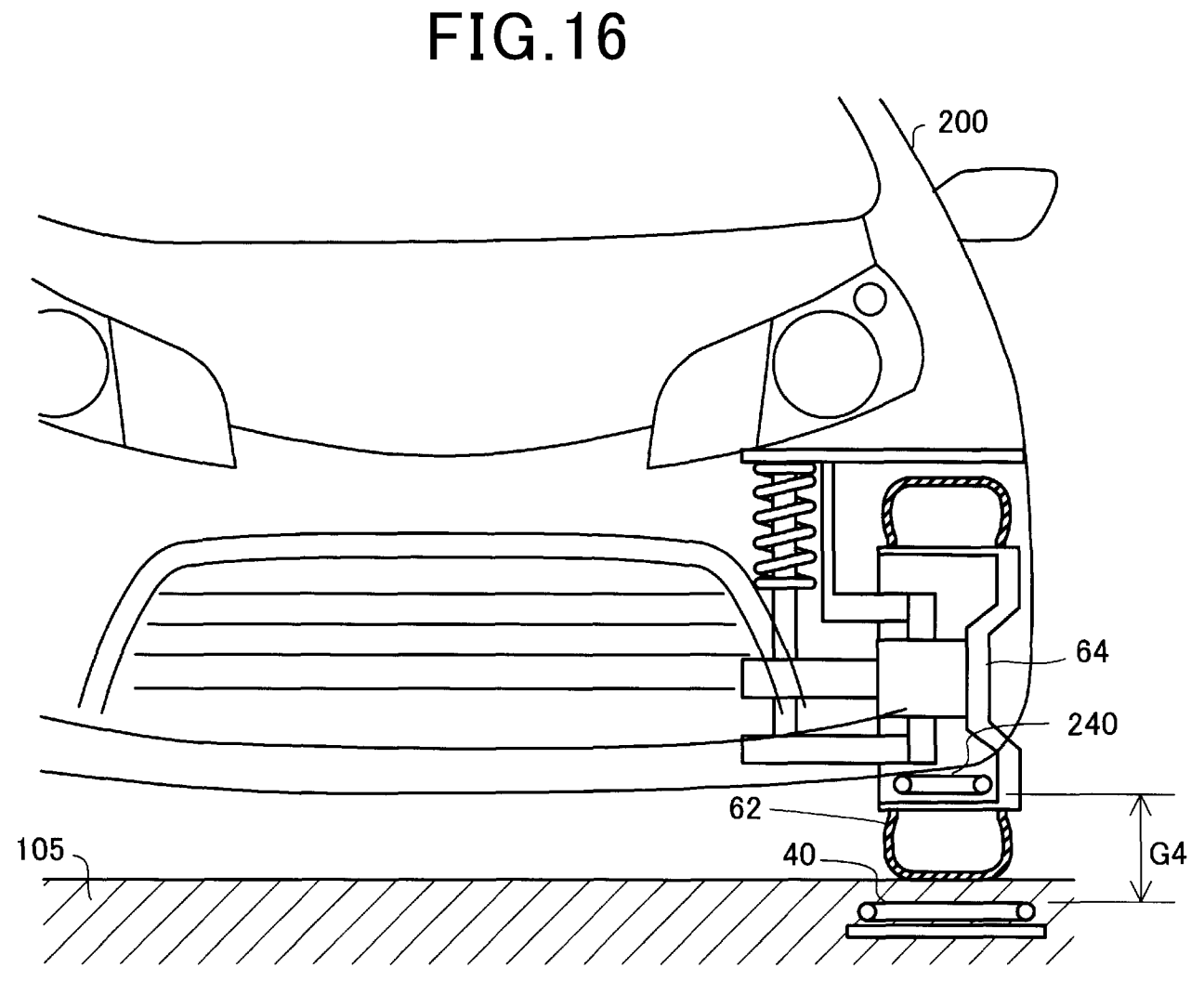

In a first reference example illustrated in FIG. 15, a power reception coil 240 is arranged on the underside 202 of a vehicle 200. The first reference example has advantages that the diameter of the power reception coil 240 can be increased and no relay coil 70 is required. However, in the first reference example, the power reception coil 240 is located at a position higher than the minimum ground clearance of the vehicle 200; therefore, the interval G3 between a power transmission coil 40 and the power reception coil 240 is wider than the interval G1 between the power transmission coils 40 and the first coils 71 in the first embodiment. On the other hand, in a second reference example illustrated in FIG. 16, an IWC (In Wheel Coil) structure is employed such that a power reception coil 240 is arranged inside a wheel 64. The second reference example has an advantage that no relay coil 70 is required. Moreover, although it depends on the flatness of the tire 62, the interval G4 between a power transmission coil 40 and the power reception coil 240 in the second reference example can be made narrower than the interval G3 between the power transmission coil 40 and the power reception coil 240 in the first reference example. Furthermore, in the second reference example, the interval G4 between the power transmission coil 40 and the power reception coil 240 remains unchanged even when fluctuation occurs in the suspension of the vehicle 200.

Figure 17:
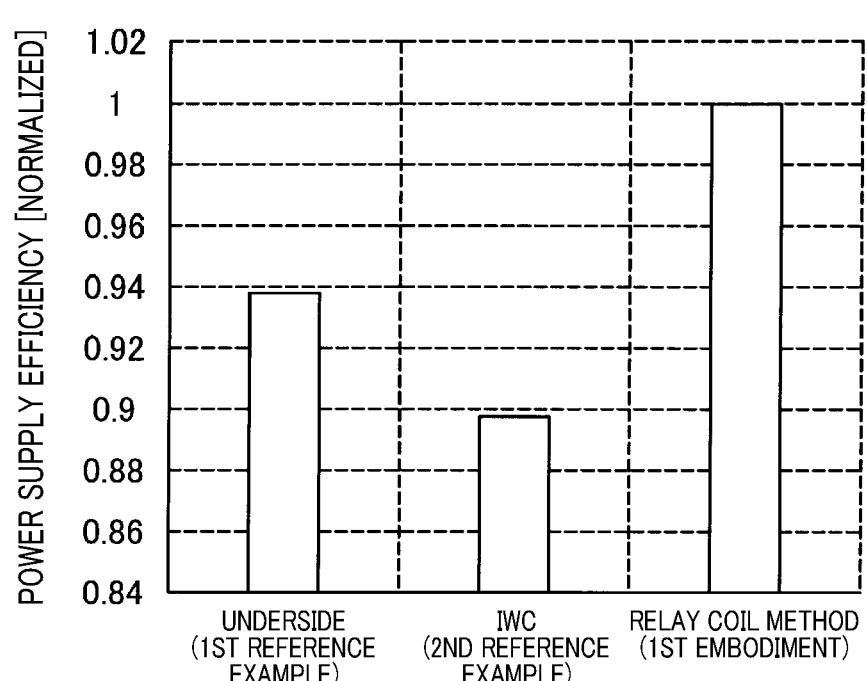
FIG. 17 is an explanatory diagram showing the power supply efficiencies in a first embodiment, the first reference example and the second reference example.

FIG. 17 shows the power supply efficiencies in the first embodiment, the first reference example and the second reference example. In FIG. 17, the power supply efficiencies are normalized so that the power supply efficiency in the first embodiment becomes 1. As can be seen from FIG. 17, the power supply efficiency in the first embodiment is the highest, followed by those in the first reference example and the second reference example in this order.

Figure 18:
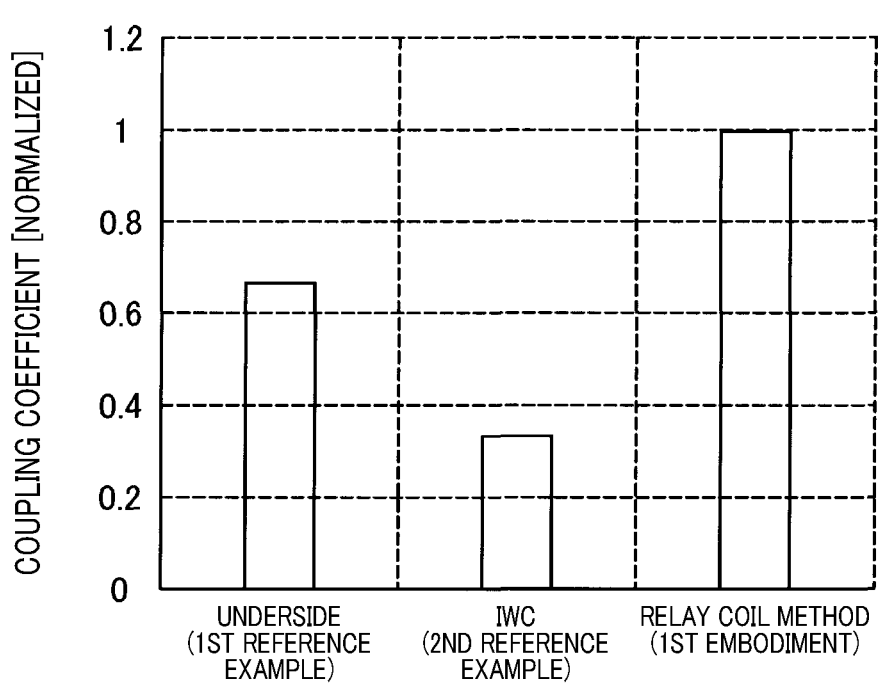
FIG. 18 is an explanatory diagram showing the coupling coefficients between a power transmission coil and a power reception coil in the first embodiment, the first reference example and the second reference example.

FIG. 18 shows the coupling coefficients between the power transmission coil 40 and the power reception coil 240 in the first embodiment, the first reference example and the second reference example. In the first embodiment, a relay coil 70 is arranged between the power transmission coil 40 and the power reception coil 240. Therefore, in the first embodiment, the coupling coefficient between the power transmission coil 40 and the power reception coil 240 is the product of the coupling coefficient ka between the power transmission coil 40 and the first coil 71 of the relay coil 70 and the coupling coefficient kb between the second coil 72 of the relay coil 70 and the power reception coil 240. In FIG. 18, the coupling coefficients are normalized so that the coupling coefficient in the first embodiment becomes 1. As can be seen from FIG. 18, the coupling coefficient in the first embodiment is the highest, followed by those in the first reference example and the second reference example in this order.

As described above, according to the first embodiment, the power reception apparatus 250 includes: a relay coil 70 that is arranged on a tired wheel 60 of the vehicle 200, which includes a tire 62 and a wheel 64, and includes a first coil 71 and a second coil 72; a power reception coil 240; and a power reception circuit 230 connected with the power reception coil 240. The first coil 71 is arranged outside the wheel 64 and inside the tire 62; therefore, the interval G1 between the first coil 71 and a power transmission coil 40 embedded in the road 105 can be set to be narrow. On the other hand, both the second coil 72 and the power reception coil 240 are arranged inside the wheel 64; therefore, the interval G2 between the second coil 72 and the power reception coil 240 can also be set to be narrow. That is, according to the first embodiment, by dividing the relay coil 70 into the first coil 71 and the second coil 72, it becomes possible to set both the interval G1 between the power transmission coil 40 and the first coil 71 and the interval G2 between the second coil 72 and the power reception coil 240 to be narrow. In addition, the first coil 71 and the second coil 72 are connected with each other by electrical conductors 73; therefore, the loss between them is only the loss occurring in the electrical conductors 73. As a result, it becomes possible to improve the total efficiency of electric power transfer from the power transmission coil 40 to the power reception coil 240.

Moreover, on the inner side of a rim 64r of the tired wheel 60, there are generally provided a hub 66 and a brake disc 67. According to the first embodiment, the power reception coil 240 is arranged on the inner side of the rim 64r. Consequently, it becomes possible to reduce the installation space of the power reception coil 240 in the vehicle 200. In addition, it also becomes possible to set the interval G2 between the power reception coil 240 and the second coil 72 to be narrow.

Furthermore, according to the first embodiment, when viewed from the central axis 61 of the tired wheel 60, the direction of the induced current flowing through the first coil 71 and the direction of the induced current flowing through the second coil 72 are opposite to each other. Consequently, it becomes possible to suppress leakage electromagnetic fields. It should be noted that the direction of the induced current flowing through the first coil 71 and the direction of the induced current flowing through the second coil 72 may not be opposite to each other when viewed from the central axis 61 of the tired wheel 60. In addition, depending on the arrangement of the first coil 71 and the second coil 72, the directions of magnetic fields generated by the two coils may be the same as or opposite to each other.

First Modification of First Embodiment

Figure 19:
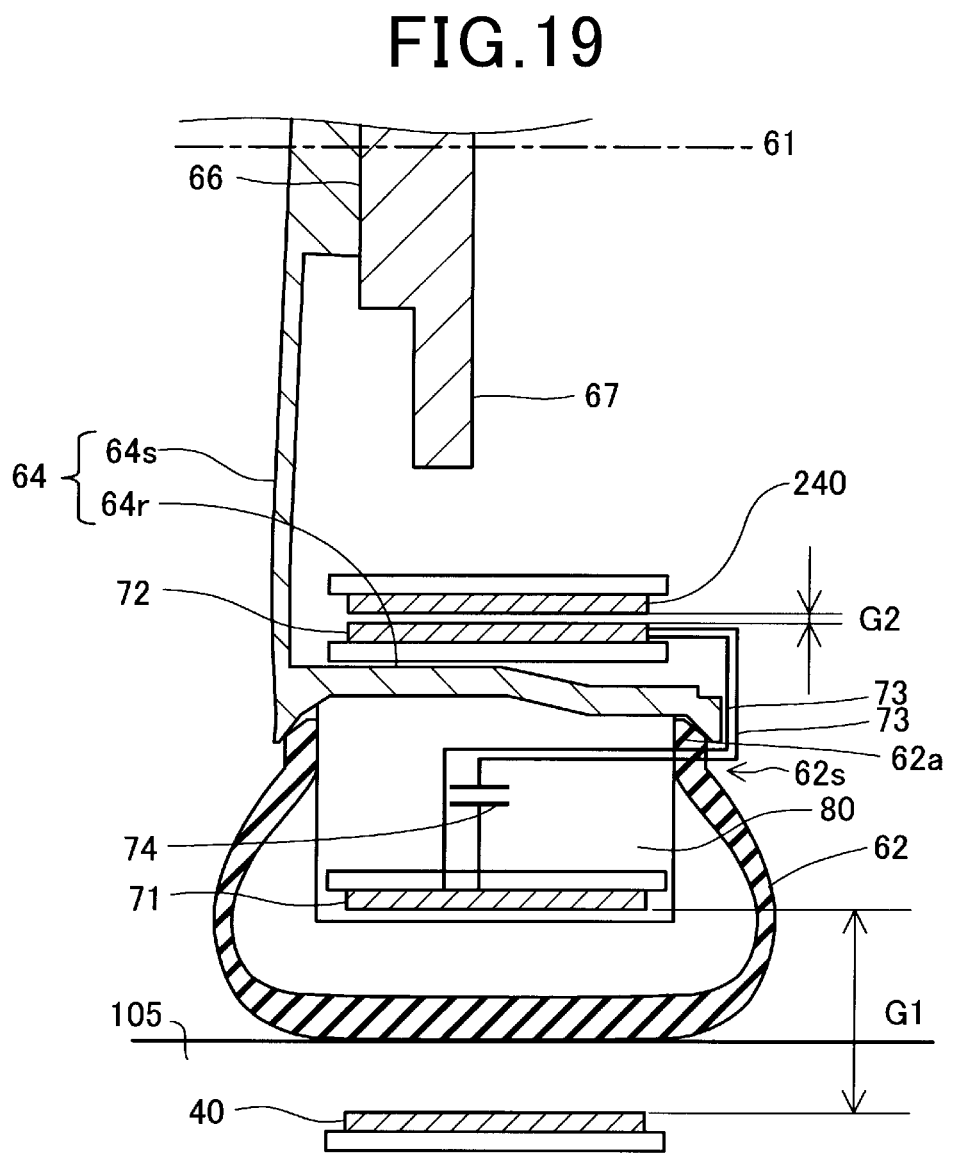

FIG. 19 is an explanatory diagram illustrating the first modification of the first embodiment. In the first embodiment illustrated in FIG. 9, the electrical conductors 73 of each of the relay coils 70 extend through the through-hole 65 formed in the rim 64r of the wheel 64. In contrast, in the first modification, the electrical conductors 73 of each of the relay coils 70 extend through a side wall 62s of the tire 62. According to the first modification, the electrical conductors 73 can be embedded in the tire 62 when the tire 62 is manufactured. As a result, it becomes unnecessary to form the through-hole 65 in the rim 64r of the wheel 64; thus it becomes easier to ensure the airtightness of the tire 62. In the first modification, after inserting the internal member 80 between the tire 62 and the wheel 64, the worker may connect the electrical conductors 73 to the first coil 71 and connect the electrical conductors 73 to the second coil 72. In addition, for aesthetic reasons, it is preferable for the electrical conductors 73 to be led out from the sidewall 62s on the opposite side to the spokes 64s of the wheel 64.

In the first modification, the interval between the power transmission coil 40 and the first coil 71 and the interval between the second coil 72 and the power reception coil 240 are the same as those in the first embodiment. Therefore, in the first modification, it is possible to achieve the same advantageous effects as achievable in the first embodiment, such as the effect of improving the efficiency of electric power transfer from the power transmission coil 40 to the power reception coil 240.

Second Modification of First Embodiment

Figure 20:
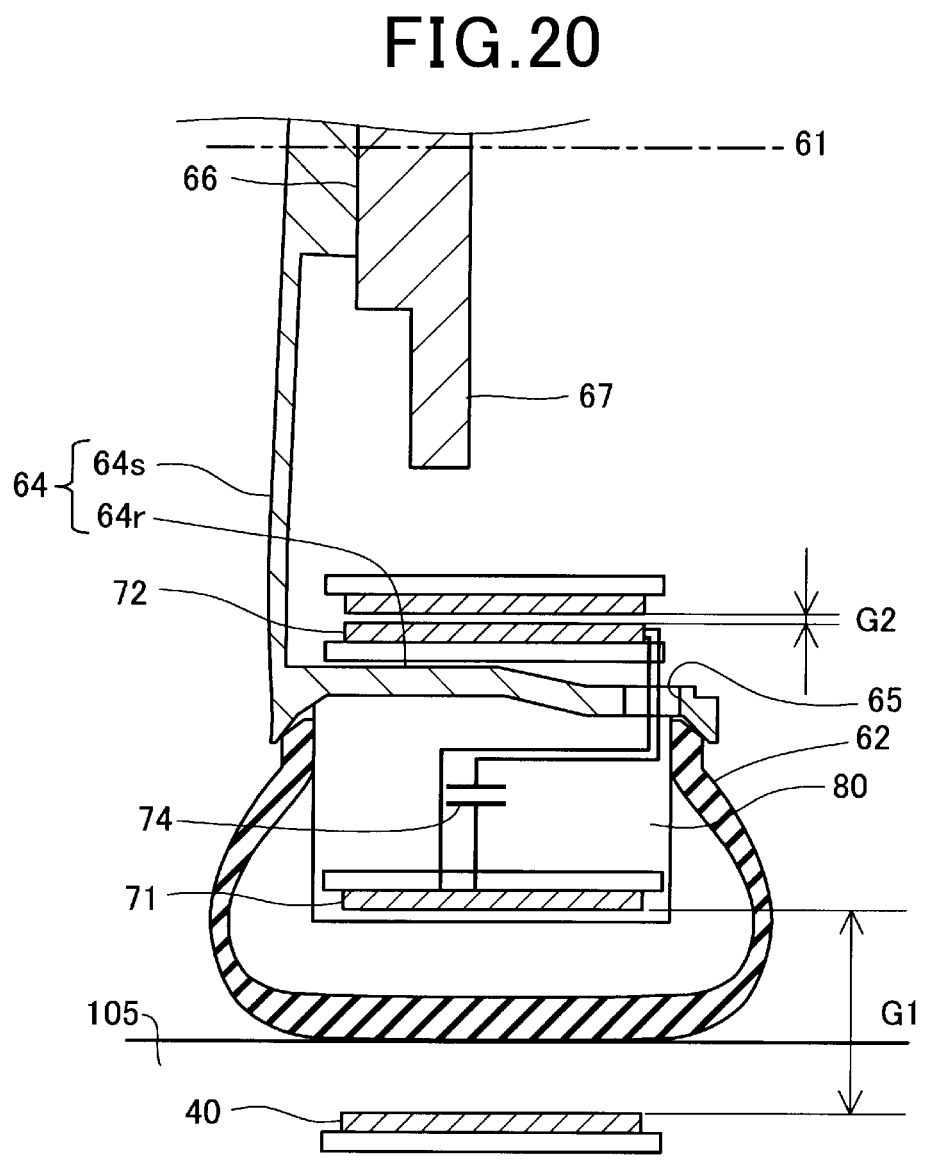
FIG. 20 is an explanatory diagram illustrating a second modification of the first embodiment.

FIG. 20 is an explanatory diagram illustrating the second modification of the first embodiment. In the first embodiment illustrated in FIG. 9, the through-hole 65 of the rim 64r of the wheel 64 is formed substantially at the center of the rim 64r. In contrast, in the second modification, the through-hole 65 is formed in an end portion of the rim 64r on the opposite side to the spokes 64s.

In the second modification, the interval between the power transmission coil 40 and the first coil 71 and the interval between the second coil 72 and the power reception coil 240 are the same as those in the first embodiment. Therefore, in the second modification, it is possible to improve the efficiency of electric power transfer from the power transmission coil 40 to the power reception coil 240 as in the first embodiment. Moreover, in the second modification, the through-hole 65, through which the electrical conductors 73 extend, is formed in the end portion of the rim 64r on the opposite side to the spokes 64s; consequently, the workability of connecting the electrical conductors 73 to the second coil 72 can be improved.

Third Modification of First Embodiment

Figure 21:
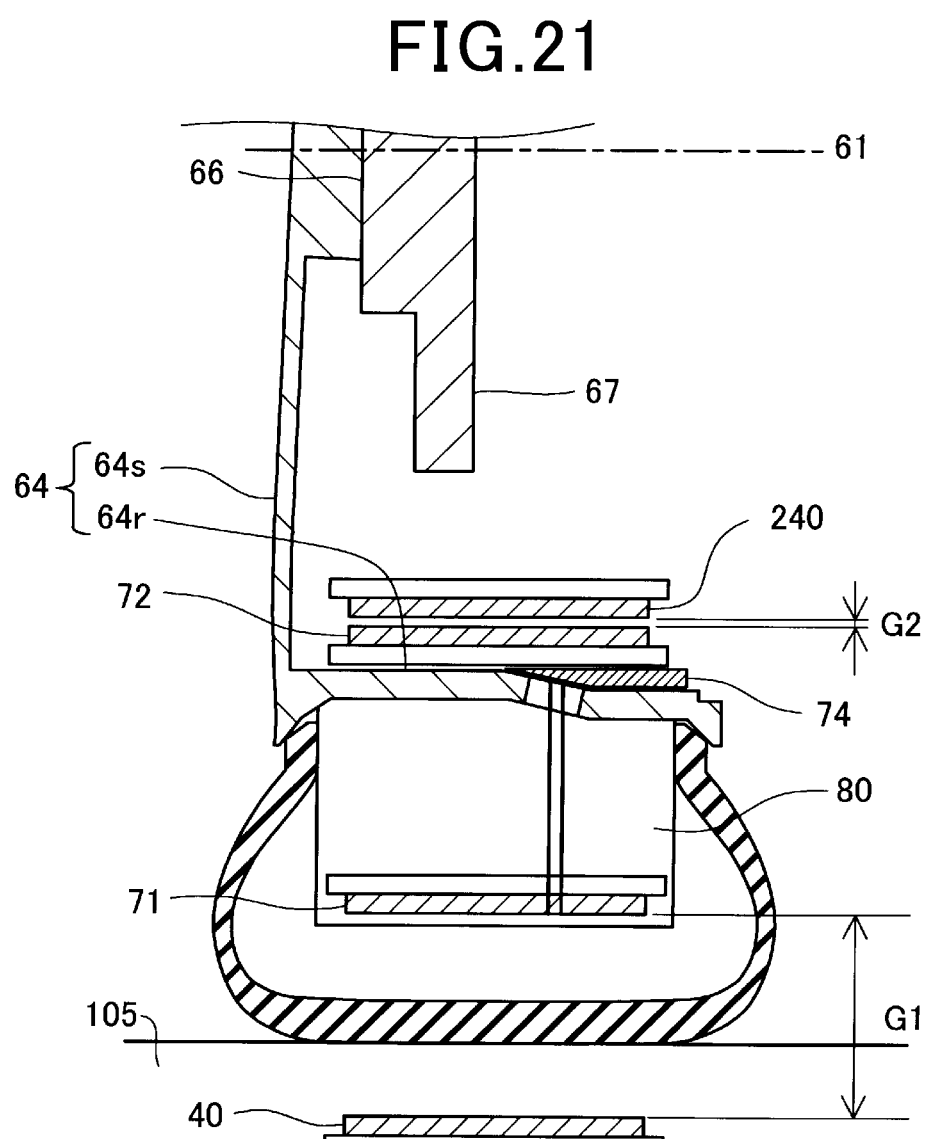
FIG. 21 is an explanatory diagram illustrating a third modification of the first embodiment.

FIG. 21 is an explanatory diagram illustrating the third modification of the first embodiment. In the first embodiment illustrated in FIG. 9, the resonant capacitor 74 is provided in the internal member 80. In contrast, in the third modification, the resonant capacitor 74 is provided at such a position as to abut an inner peripheral surface of the rim 64r of the wheel 64.

In the third modification, the interval between the power transmission coil 40 and the first coil 71 and the interval between the second coil 72 and the power reception coil 240 are the same as those in the first embodiment. Therefore, in the third modification, it is possible to achieve the same advantageous effects as achievable in the first embodiment, such as the effect of improving the efficiency of electric power transfer from the power transmission coil 40 to the power reception coil 240.

During traveling of the vehicle 200, centrifugal force acts on each member of the tired wheel 60. In the third modification, on the outer peripheral side of the resonant capacitor 74, there is located the rim 64r of the wheel 64; consequently, the centrifugal force acting on the resonant capacitor 74 can be received by the rim 64r. As a result, it becomes unnecessary to excessively increase the strength of fixing the resonant capacitor 74 by a fixture, an adhesive or the like; thus, it becomes possible to facilitate the design.

Fourth Modification of First Embodiment

Figure 22:
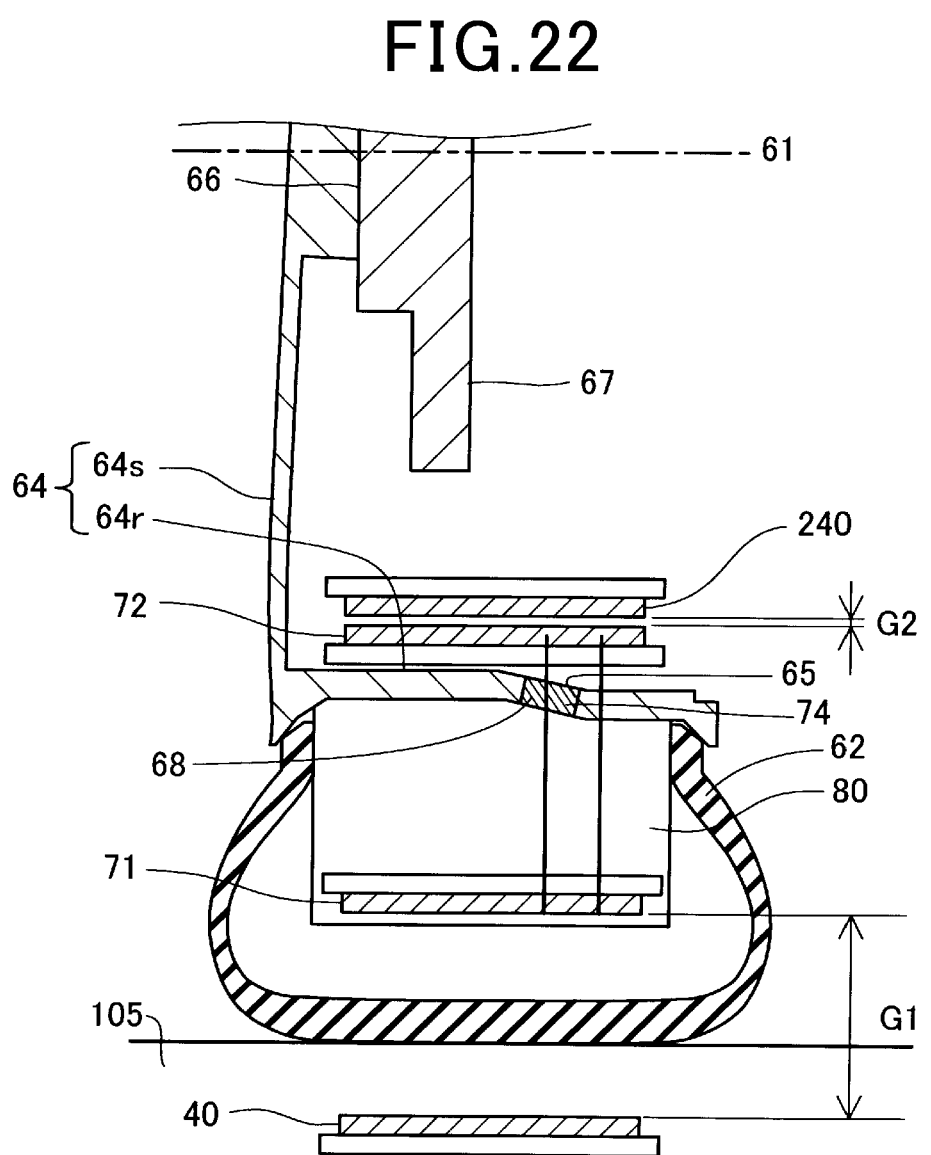
FIG. 22 is an explanatory diagram illustrating a fourth modification of the first embodiment.

FIG. 22 is an explanatory diagram illustrating the fourth modification of the first embodiment. In the third modification illustrated in FIG. 21, the resonant capacitor 74 is arranged in contact with the inner peripheral surface of the rim 64r. In contrast, in the fourth modification, the resonant capacitor 74 is arranged in the through-hole 65 of the rim 64r and fixed with a resin 68.

In the fourth modification, the interval between the power transmission coil 40 and the first coil 71 and the interval between the second coil 72 and the power reception coil 240 are the same as those in the first embodiment. Therefore, in the fourth modification, it is possible to achieve the same advantageous effects as achievable in the first embodiment, such as the effect of improving the efficiency of electric power transfer from the power transmission coil 40 to the power reception coil 240. Moreover, in the fourth modification, the resonant capacitor 74 is arranged in the through-hole 65 of the rim 64r and fixed with the resin 68; consequently, it becomes possible to utilize the resin 68, which is provided for securing airtightness of the tire 62, also for fixing the resonant capacitor 74.

Fifth Modification of First Embodiment

Figure 23:
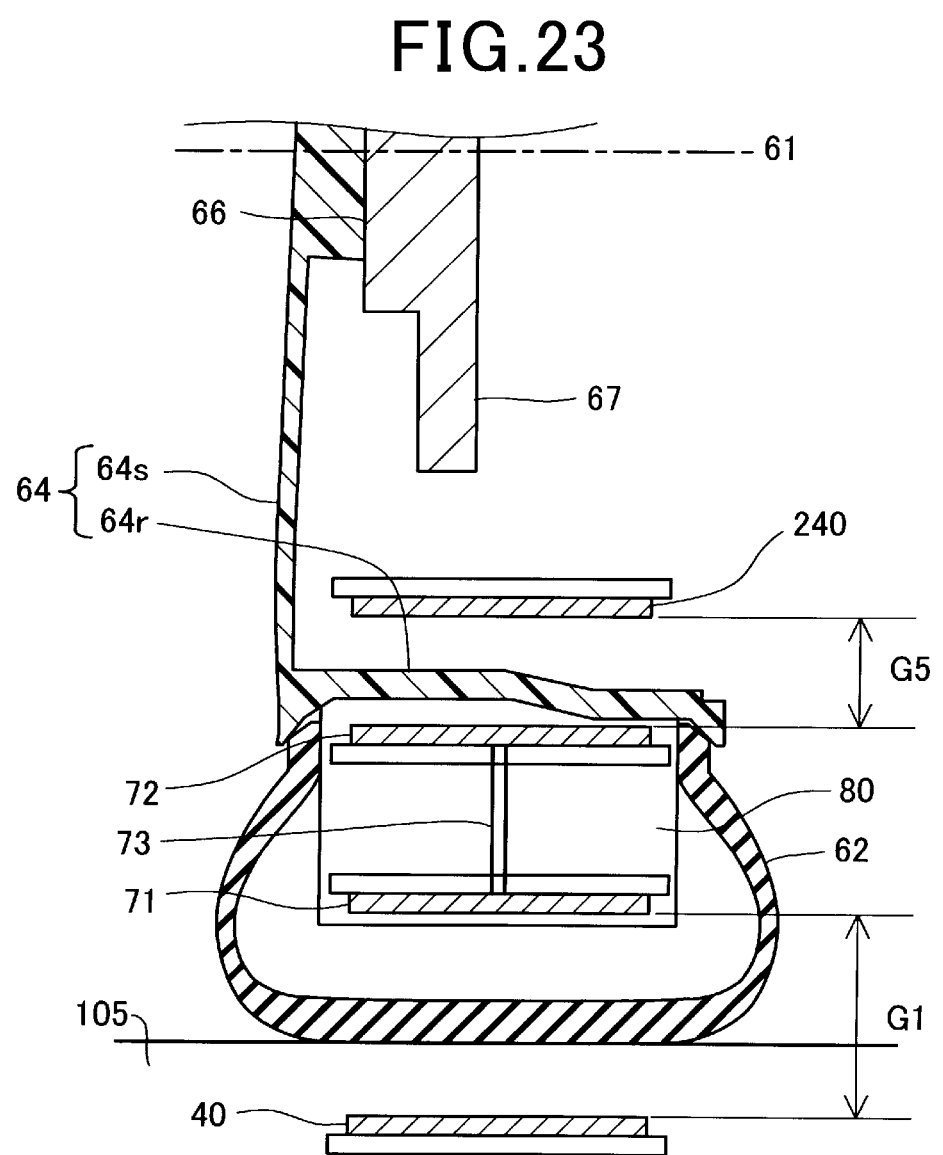
FIG. 23 is an explanatory diagram illustrating a fifth modification of the first embodiment.

FIG. 23 is an explanatory diagram illustrating the fifth modification of the first embodiment. In the first embodiment illustrated in FIG. 9, the second coil 72 is arranged on the inner side of the rim 64r of the wheel 64, i.e., on the central axis 61 side. In contrast, in the fifth modification, the second coil 72 is arranged on the outer side of the rim 64r of the wheel 64. Moreover, in the fifth modification, at least the rim 64r of the wheel 64 is formed of a resin. The spokes 64s of the wheel 64 may be formed of a resin or a metal.

More particularly, in the example illustrated in FIG. 23, both the rim 64r and the spokes 64s of the wheel 64 are formed of a resin.

In the fifth modification, the interval between the power transmission coil 40 and the first coil 71 is the same as that in the first embodiment. Therefore, in the fifth modification, it is also possible to achieve the effect of improving the efficiency of electric power transfer from the power transmission coil 40 to the first coil 71 as in the first embodiment.

Moreover, in the fifth modification, both the first coil 71 and the second coil 72 are attached to the internal member 80. Therefore, both the first coil 71 and the second coil 72 can be installed at the same time only by placing the internal member 80 between the tire 62 and the wheel 64. In addition, in the fifth modification, it is unnecessary to form a through-hole in the wheel 64 or in the tire 62; consequently, it becomes possible to improve airtightness of the tire 62.

Sixth Modification of First Embodiment

Figure 24:
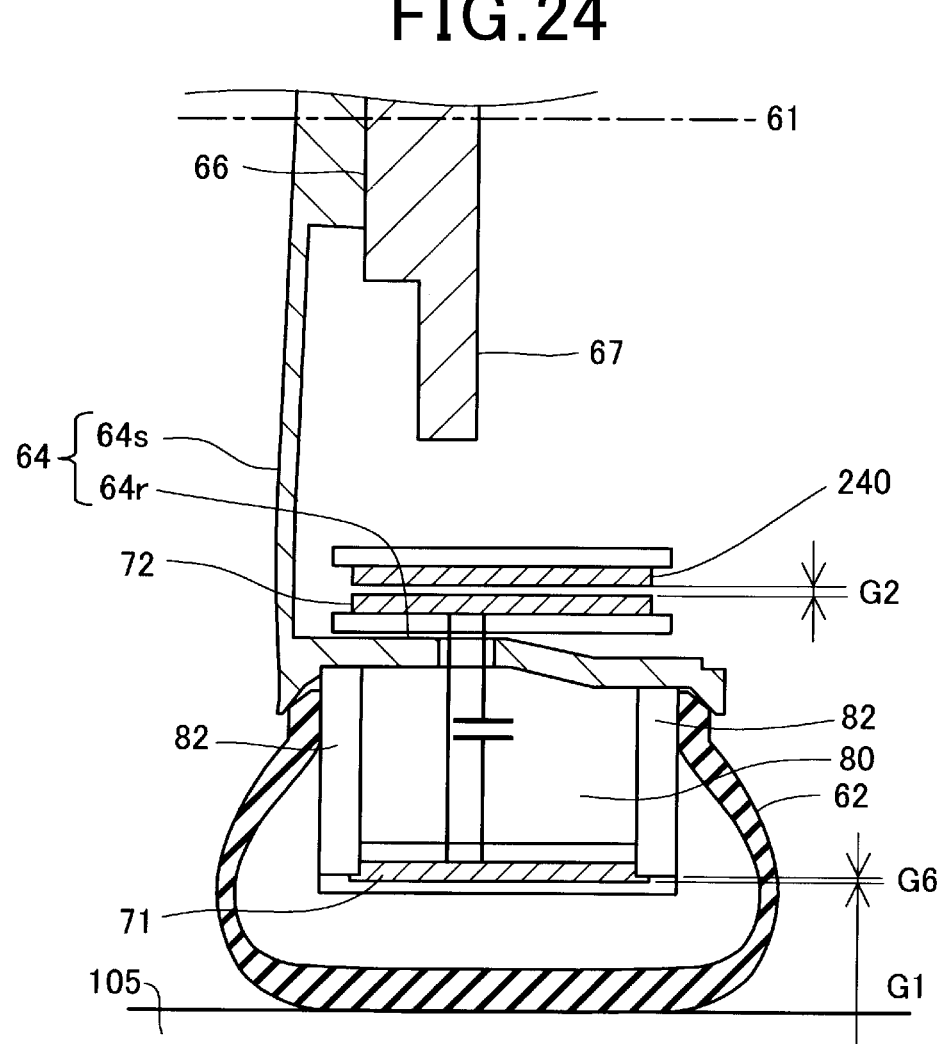
FIG. 24 is an explanatory diagram illustrating a sixth modification of the first embodiment.

FIG. 24 is an explanatory diagram illustrating the sixth modification of the first embodiment. In the first embodiment illustrated in FIG. 9, the internal member 80 has no other members attached to the surfaces thereof extending in the tire radial direction. In contrast, in the sixth modification, on the surfaces of the internal member 80 which extend in the tire radial direction, there are provided thermally-conductive members 82 in contact with both the first coil 71 and the wheel 64. The thermally-conductive members 82 may be formed of a material having a higher thermal conductivity than air, such as a metal. In addition, since the first coil 71, the second coil 72 and the electrical conductors 73 are covered with a resin, they are prevented from being short-circuited by the thermally-conductive members 82. The distance from the central axis 61 to the distal ends of the thermally-conductive members 82 is shorter than the distance from the central axis 61 to the first coil 71 by a length G6.

In the sixth modification, the interval between the power transmission coil 40 and the first coil 71 and the interval between the second coil 72 and the power reception coil 240 are the same as those in the first embodiment. Therefore, in the sixth modification, it is possible to achieve the same advantageous effects as achievable in the first embodiment, such as the effect of improving the efficiency of electric power transfer from the power transmission coil 40 to the power reception coil 240.

Moreover, in the sixth modification, when the temperature of the first coil 71 is increased by the induced current flowing therethrough, the heat of the first coil 71 can be dissipated to the wheel 64 via the thermally-conductive members 82. In addition, since the thermally-conductive members 82 are formed of a metal, they can block leakage of an electromagnetic field. It should be noted that the thermally-conductive members 82 may alternatively be formed of any other material having a higher thermal conductivity than air. In the case of the thermally-conductive members 82 being formed of a nonmagnetic material, it is unnecessary to consider interference thereof with the first coil 71. Further, it should be noted that the thermally-conductive members 82 may be formed in the shape of a bar or plate extending from the rim 64r to the first coil 71. Alternatively, the thermally-conductive members 82 may have a rectangular tubular shape. Furthermore, it should be noted that there may be provided only one thermally-conductive member 82 or a plurality of thermally-conductive members 82 between the first coil 71 and the wheel 64.

In addition, in the sixth modification, providing the thermally-conductive members 82 on the inner side of the external shape of the first coil 71, decrease in the efficiency can be suppressed.

Seventh Modification of First Embodiment

Figure 25:
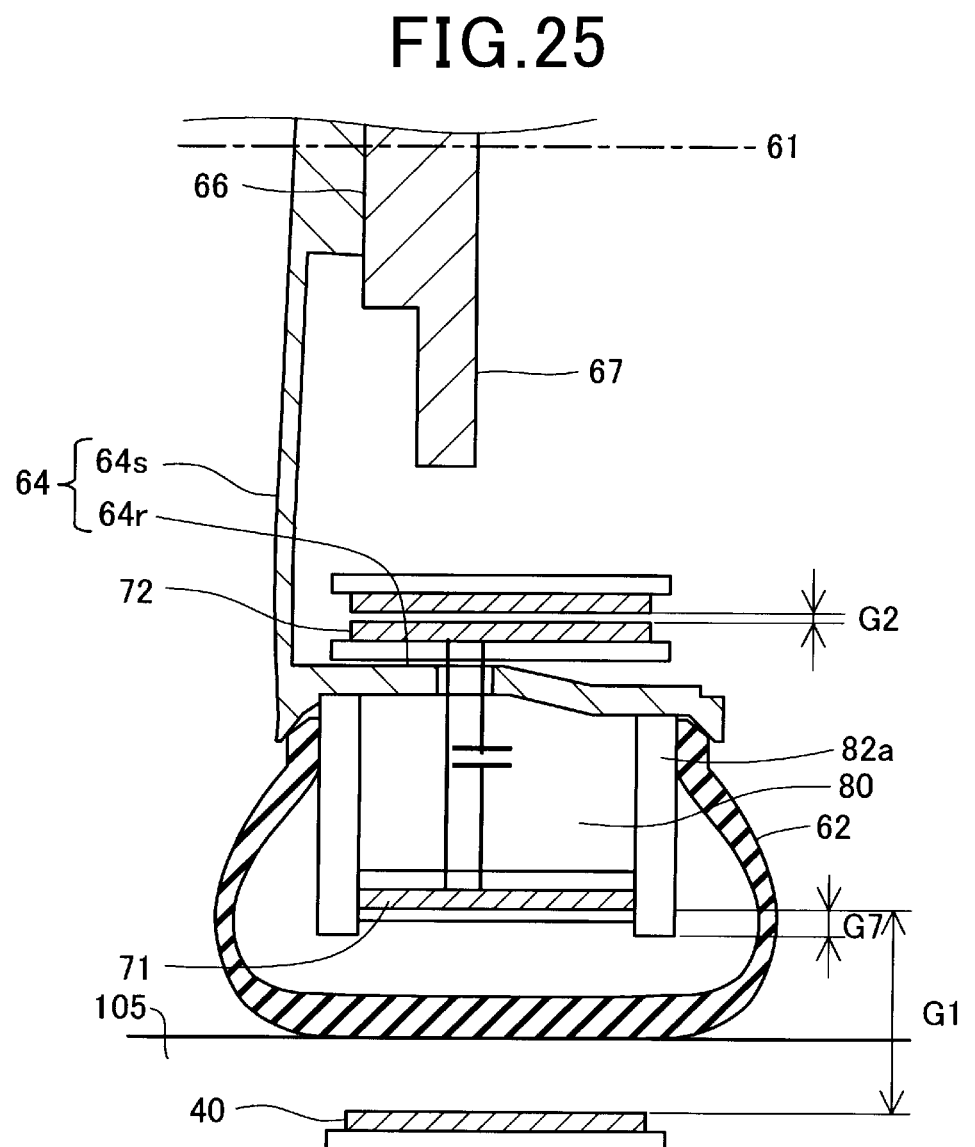
FIG. 25 is an explanatory diagram illustrating a seventh modification of the first embodiment.

FIG. 25 is an explanatory diagram illustrating the seventh modification of the first embodiment. In the sixth modification shown in FIG. 24, the distance from the central axis 61 to the distal ends of the thermally-conductive members 82 is shorter than the distance from the central axis 61 to the first coil 71 by the length G6. In contrast, in the seventh modification, the distance from the central axis 61 to the distal ends of the thermally-conductive members 82a is longer than the distance from the central axis 61 to the first coil 71 by a length G7.

In the seventh modification, the interval between the power transmission coil 40 and the first coil 71 and the interval between the second coil 72 and the power reception coil 240 are the same as those in the first embodiment. Therefore, in the seventh modification, it is possible to achieve the same advantageous effects as achievable in the first embodiment, such as the effect of improving the efficiency of electric power transfer from the power transmission coil 40 to the power reception coil 240. Moreover, in the seventh modification, when the temperature of the first coil 71 is increased by the induced current flowing therethrough, the heat of the first coil 71 can be dissipated to the wheel 64 via the thermally-conductive members 82a as in the sixth modification. In addition, in the seventh modification, since the thermally-conductive members 82a are formed of a metal, they can block leakage of an electromagnetic field.

Furthermore, in the seventh modification, the distance from the central axis 61 to the distal ends of thermally-conductive members 82a is longer than the distance from the central axis 61 to the first coil 71 by the length G7. Therefore, when the road 105 has irregularities and the tire 62 is deformed by the irregularities of the road 105, at least part of the influence is received by the thermally-conductive members so that deformation of the first coil 71 can be suppressed. Accordingly, it is possible to reduce the interval G1 between the first coil 71 and the power transmission coil 40.

Eighth Modification of First Embodiment

Figure 26:
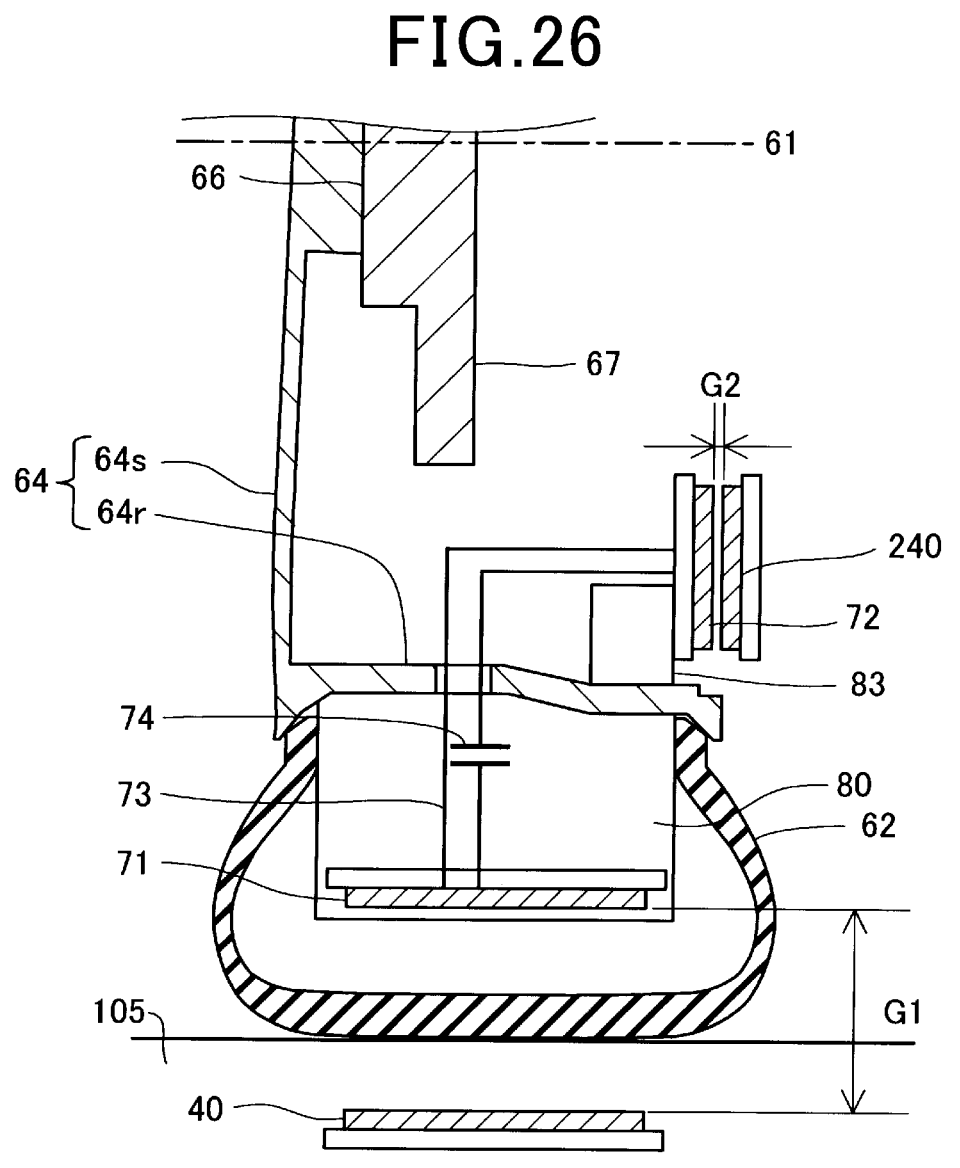

FIG. 26 is an explanatory diagram illustrating the eighth modification of the first embodiment. In the first embodiment illustrated in FIG. 9, the second coil 72 is arranged substantially parallel to the rim 64r of the wheel 64. In contrast, in the eighth modification, the second coil 72 is arranged substantially perpendicular to the central axis 61 of the tired wheel 60 by an attachment member 83 attached to the inner periphery of the rim 64.

In the eighth modification, the interval between the power transmission coil 40 and the first coil 71 and the interval between the second coil 72 and the power reception coil 240 are the same as those in the first embodiment. Therefore, in the eighth modification, it is possible to achieve the same advantageous effects as achievable in the first embodiment, such as the effect of improving the efficiency of electric power transfer from the power transmission coil 40 to the power reception coil 240. Moreover, in the eighth modification, since the power reception coil 240 can be arranged outside the wheel 64, the design and manufacturing are facilitated.

Ninth Modification of First Embodiment

Figure 27:
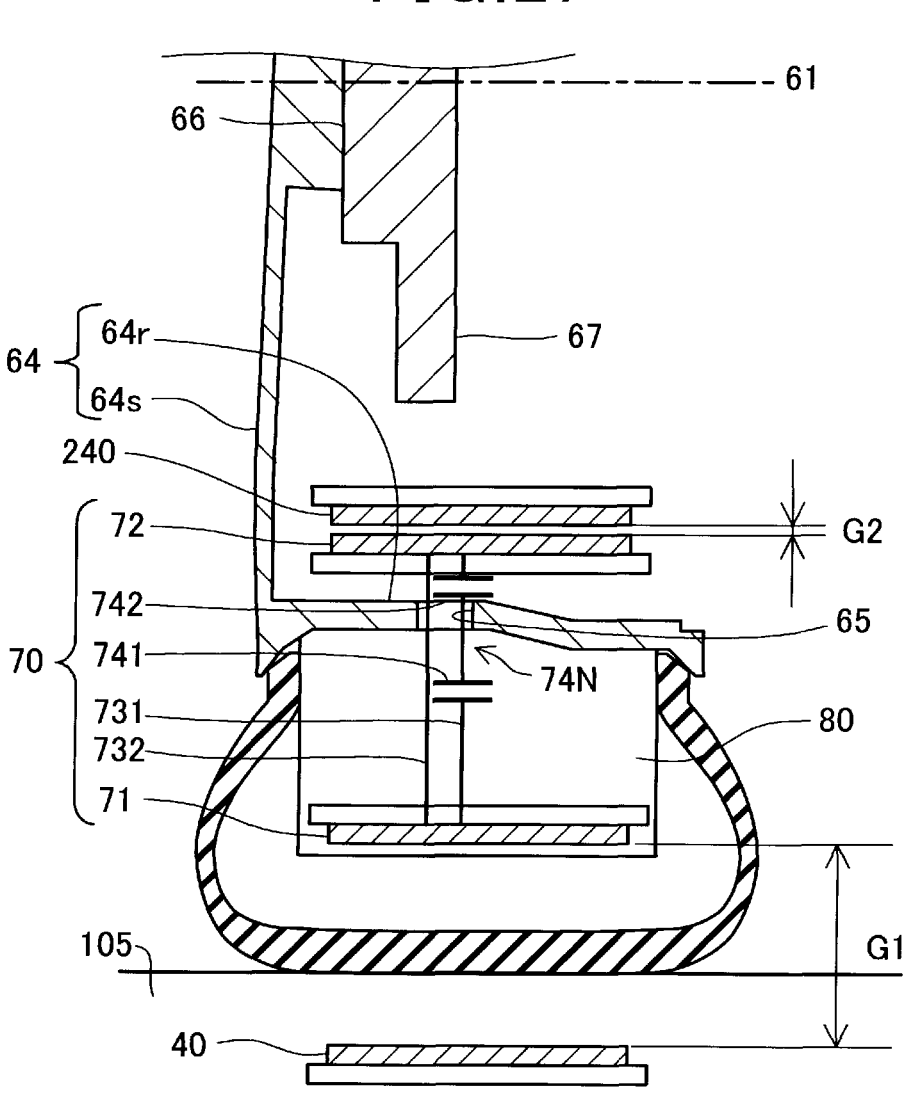
FIG. 27 is an explanatory diagram illustrating a ninth modification of the first embodiment.
Figure 28:
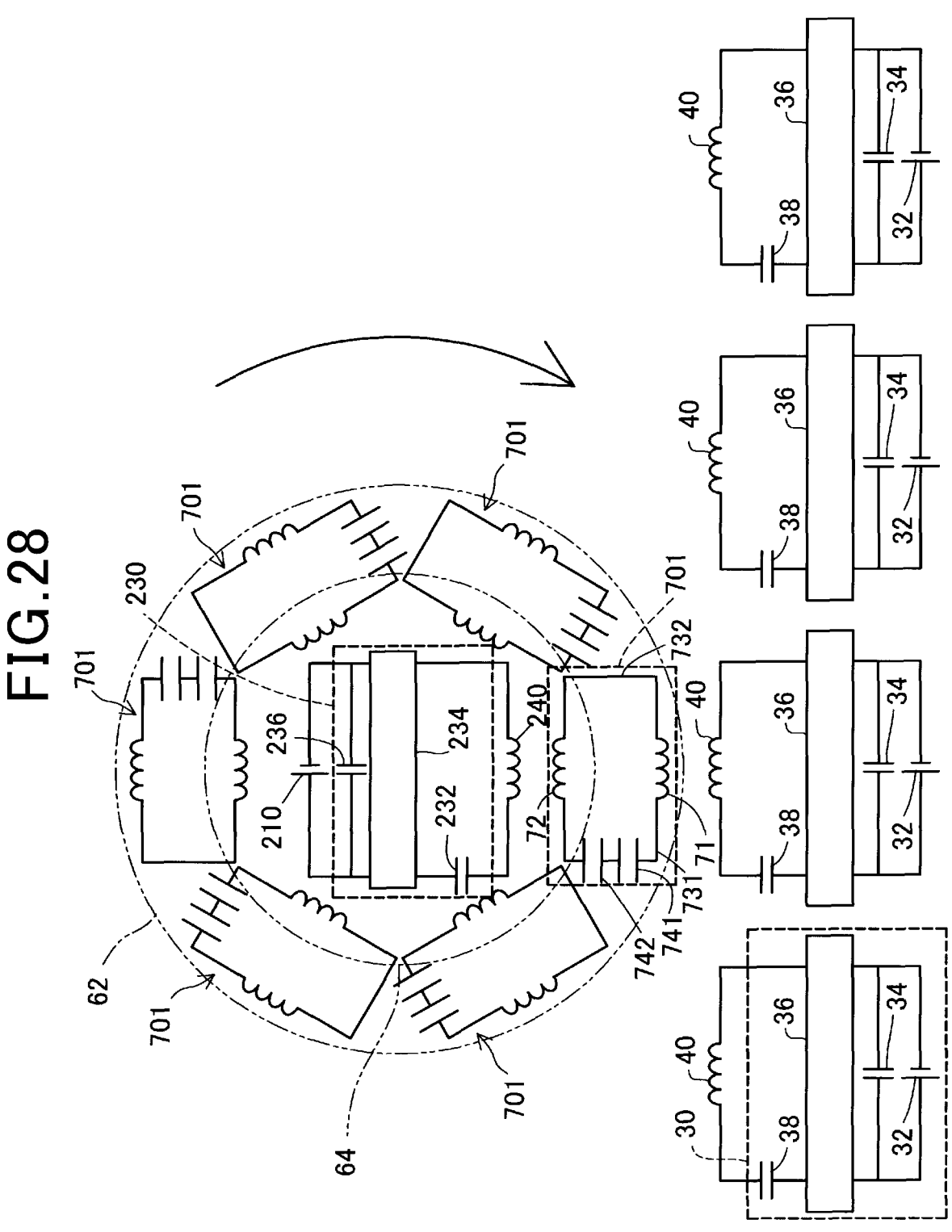
FIG. 28 is a schematic circuit diagram of the ninth modification.

FIG. 27 is an explanatory diagram illustrating the ninth modification of the first embodiment. FIG. 28 is a schematic circuit diagram of the ninth modification. In the first embodiment illustrated in FIG. 9, each of the relay coils 70 includes only one resonant capacitor 74. In contrast, in the ninth modification, each of the relay coils 701 includes two individual resonant capacitors, i.e., a resonant capacitor 741 for the first coil 71 and a resonant capacitor 742 for the second coil 72. Specifically, of the two electrical conductors 731 and 732 connecting the first coil 71 and the second coil 72, the resonant capacitors 741 and 742 are provided in series with each other in the electrical conductor 731 whereas no resonant capacitor is provided in the electrical conductor 732.

In the ninth modification, the interval between the power transmission coil 40 and the first coil 71 and the interval between the second coil 72 and the power reception coil 240 are the same as those in the first embodiment. Therefore, in the ninth modification, it is possible to achieve the same advantageous effects as achievable in the first embodiment, such as the effect of improving the efficiency of electric power transfer from the power transmission coil 40 to the power reception coil 240.

Moreover, in the ninth modification, the resonant capacitor 741 for the first coil 71 and the resonant capacitor 742 for the second coil 72 are connected in series with each other and thus the electric potential at a node 74N between them is zero. Therefore, it is unnecessary to consider the dielectric strength of the node 74N.

Tenth Modification of First Embodiment

Figure 29:
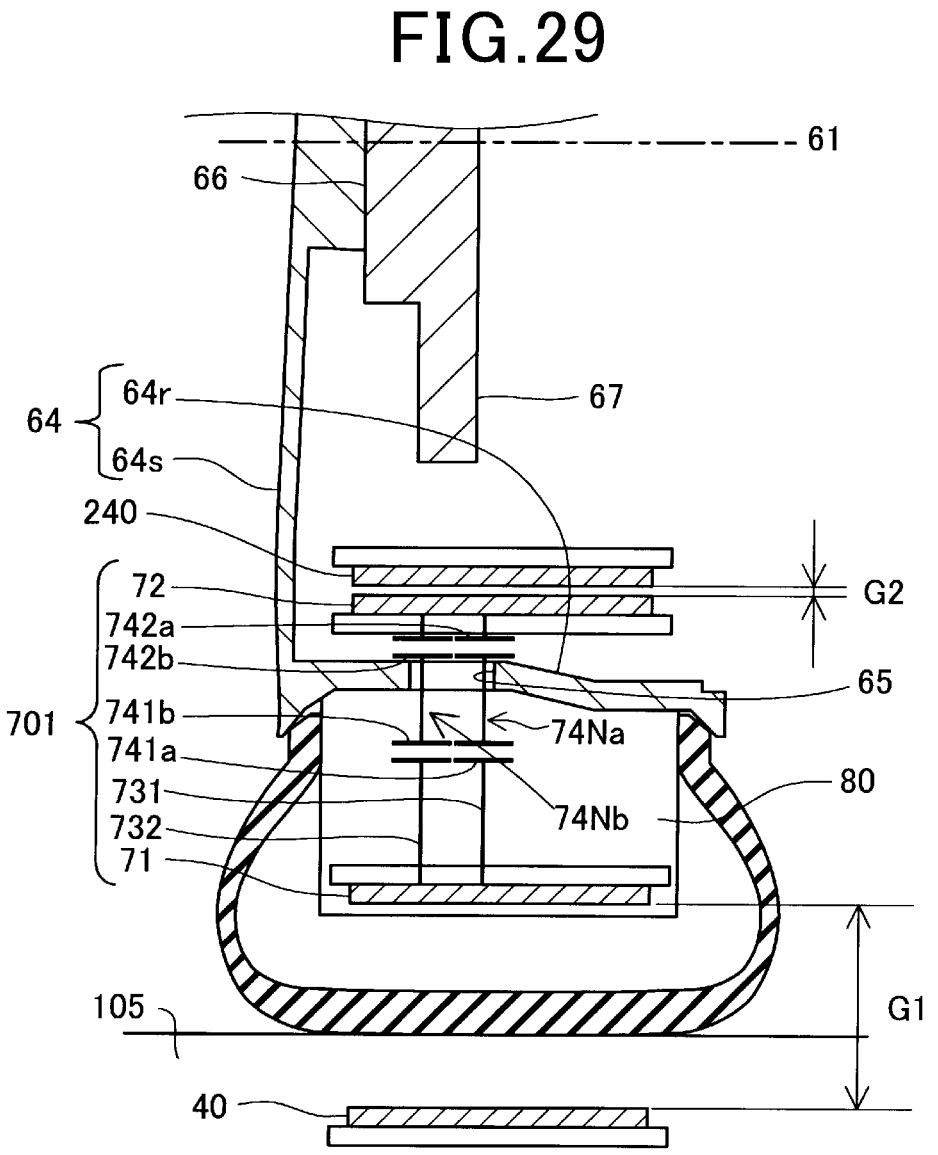
FIG. 29 is an explanatory diagram illustrating a tenth modification of the first embodiment.

FIG. 29 is an explanatory diagram illustrating the tenth modification of the first embodiment. In the ninth modification illustrated in FIG. 27, of the two electrical conductors 731 and 732 connecting the first coil 71 and the second coil 72, the resonant capacitor 741 for the first coil 71 and the resonant capacitor 742 for the second coil 72 are connected in series with each other only in the electrical conductor 731. In contrast, in the tenth modification, a resonant capacitor 741a for the first coil 71 and a resonant capacitor 742a for the second coil 72 are connected in series with each other in the electrical conductor 731, whereas a resonant capacitor 741b for the first coil 71 and a resonant capacitor 742b for the second coil 72 are connected in series with each other in the electrical conductor 732.

In the tenth modification, the interval between the power transmission coil 40 and the first coil 71 and the interval between the second coil 72 and the power reception coil 240 are the same as those in the first embodiment. Therefore, in the tenth modification, it is possible to achieve the same advantageous effects as achievable in the first embodiment, such as the effect of improving the efficiency of electric power transfer from the power transmission coil 40 to the power reception coil 240.

Moreover, in the tenth modification, the resonant capacitor 741a for the first coil 71 and the resonant capacitor 742a for the second coil 72 are connected in series with each other and thus the electric potential at a node 74Na between them is zero; therefore, it is unnecessary to consider the dielectric strength of the node 74Na. The same applies to a node 74Nb between the resonant capacitor 741b for the first coil 71 and the resonant capacitor 742b for the second coil 72.

Eleventh Modification of First Embodiment

FIG. 30 is an explanatory diagram illustrating the eleventh modification of the first embodiment. In the first embodiment illustrated in FIG. 10, the connector 75 is provided on the second coil 72 side of the rim 64r of the wheel 64. In contrast, in the eleventh modification, a connector 75a is provided on the first coil 71 side of the rim 64r of the wheel 64 and a connector 75b is provided on the second coil 72 side of the rim 64r of the wheel 64.

In the eleventh modification, the interval between the power transmission coil 40 and the first coil 71 and the interval between the second coil 72 and the power reception coil 240 are the same as those in the first embodiment. Therefore, in the eleventh modification, it is possible to achieve the same advantageous effects as achievable in the first embodiment, such as the effect of improving the efficiency of electric power transfer from the power transmission coil 40 to the power reception coil 240.

Moreover, according to the eleventh modification, those parts of the electrical conductors 73 which are located between the two connectors 75a and 75b can be formed integrally with the wheel 64 and thus airtightness of the tire 62 can be easily secured. In the case of the electrical conductors 73, which extend through the through-hole 65, being formed of stranded wires such as litz wires, it is necessary to impregnate a resin into the electrical conductors 73. In this case, dividing each of the electrical conductors 73 into a plurality of parts with the use of the connectors 75, the manufacturing is facilitated. In this way, using litz wires or the like, it is possible to suppress increase in the AC resistances of the electrical conductors due to the high-frequency-specific skin effect and proximity effect, thereby suppressing increase in the temperatures of the coils.

Twelfth Modification of First Embodiment

FIG. 31 is an explanatory diagram illustrating the twelfth modification of the first embodiment. In the first embodiment illustrated in FIG. 11, the electrical conductors 73 extend through the through-hole 76c of the valve 76. In contrast, in the twelfth modification, a hollow copper bar 79 extends through the through-hole 76c of the valve 76. The copper bar 79 functions as a wiring member to connect the first coil 71 and the second coil 72. It should be noted that although only one copper bar 79 is illustrated in FIG. 31, each of the relay coils 70 actually includes two copper bars 79.

Figure 32:
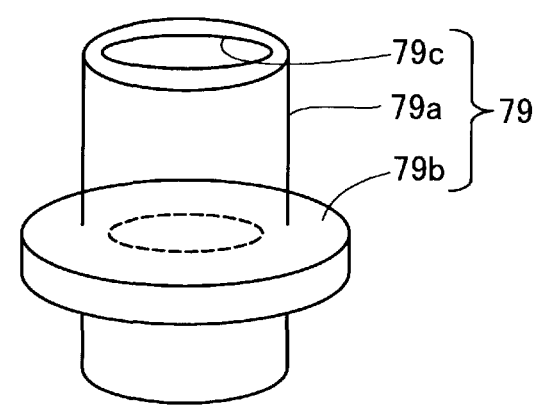
FIG. 32 is an explanatory diagram illustrating an example of connection using a copper bar.

FIG. 32 is an explanatory diagram illustrating the configuration of the copper bar 79. As shown in FIG. 32, the copper bar 79 has a cylindrical portion 79a, a flange 79b and a hole 79c. The flange 79b prevents the copper bar 79 from being detached from the hermetic seal 78 when the copper bar 79 is pulled. The hole 79c is closed halfway. Therefore, airtightness of the tire 62 can be maintained.

In the twelfth modification, the interval between the power transmission coil 40 and the first coil 71 and the interval between the second coil 72 and the power reception coil 240 are the same as those in the first embodiment. Therefore, in the twelfth modification, it is possible to achieve the same advantageous effects as achievable in the first embodiment, such as the effect of improving the efficiency of electric power transfer from the power transmission coil 40 to the power reception coil 240.

Moreover, according to the twelfth modification, the copper bar 79 is provided with the flange 79b; therefore, it is difficult for the copper bar 79 to be detached from the hermetic seal 78.

Thirteenth Modification of First Embodiment

Figure 33:
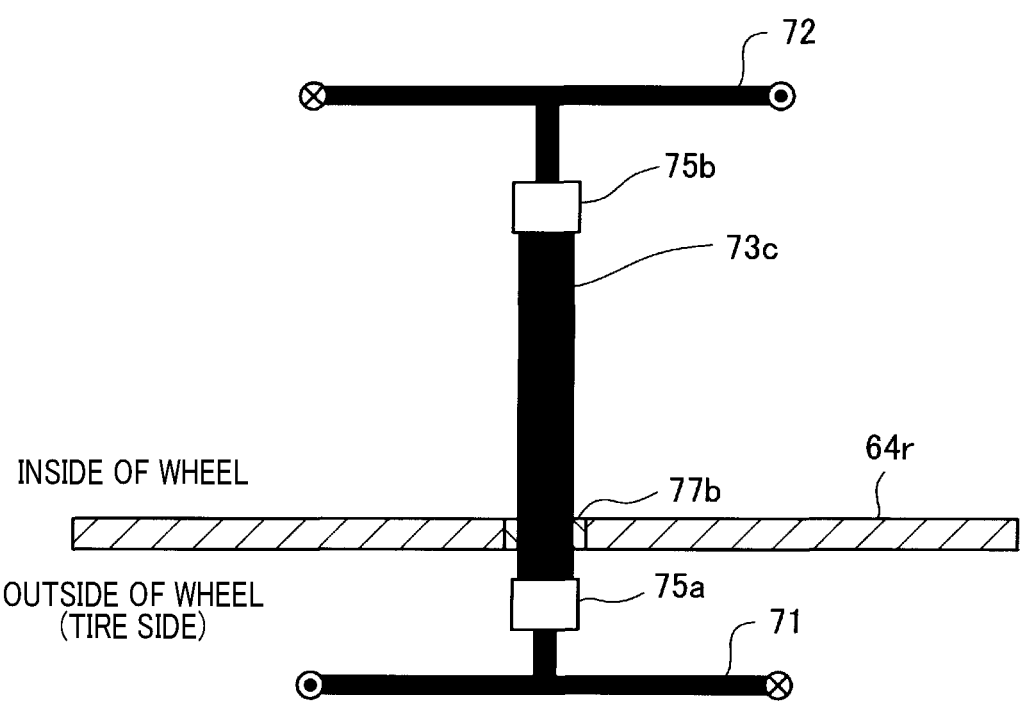
FIG. 33 is an explanatory diagram illustrating a thirteenth modification of the first embodiment.

FIG. 33 is an explanatory diagram illustrating the thirteenth modification of the first embodiment. In the eleventh modification illustrated in FIG. 30, the two connectors 75a and 75b are connected by the electrical conductors 73. In contrast, in the thirteenth modification, the two connectors 75a and 75b are connected by a copper busbar 73c. The copper busbar 73c extends through the through-hole 65 formed in the rim 64r of the wheel 64; and the through-hole 65 is filled with a resin 77b.

In the thirteenth modification, the interval between the power transmission coil 40 and the first coil 71 and the interval between the second coil 72 and the power reception coil 240 are the same as those in the first embodiment. Therefore, in the thirteenth modification, it is possible to achieve the same advantageous effects as achievable in the first embodiment, such as the effect of improving the efficiency of electric power transfer from the power transmission coil 40 to the power reception coil 240.

Moreover, according to the thirteenth modification, the copper busbar 73c can be manufactured integrally with the wheel 64 and thus airtightness of the tire 62 can be maintained.

Fourteenth Modification of First Embodiment

Figure 34:
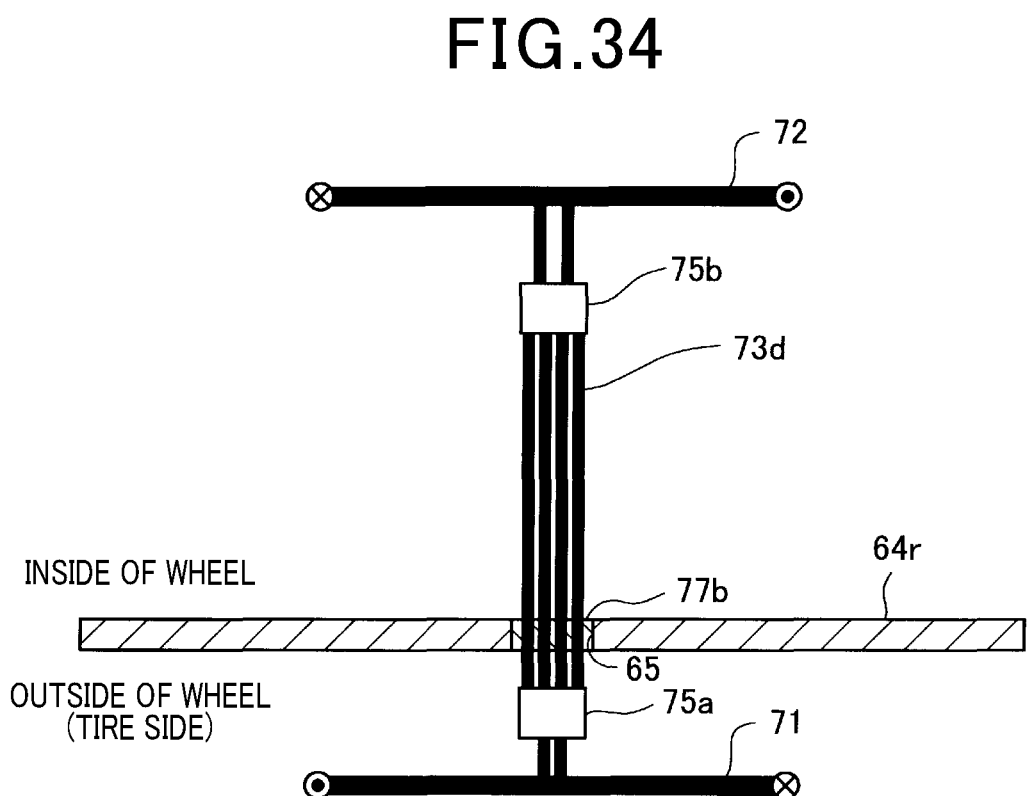
FIG. 34 is an explanatory diagram illustrating a fourteenth modification of the first embodiment.

FIG. 34 is an explanatory diagram illustrating the fourteenth modification of the first embodiment. In the thirteenth modification illustrated in FIG. 33, there is provided the single copper busbar 73c between the two connectors 75a and 75b. In contrast, in the fourteenth modification, between the two connectors 75a and 75b, there is provided a copper busbar 73d that is constituted of a plurality of copper bars. In the fourteenth modification, it is possible to achieve the same advantageous effects as achievable in the thirteenth modification. In addition, according to the fourteenth modification, it is possible to suppress the skin effect of the copper busbar 73d.

Figure 35:
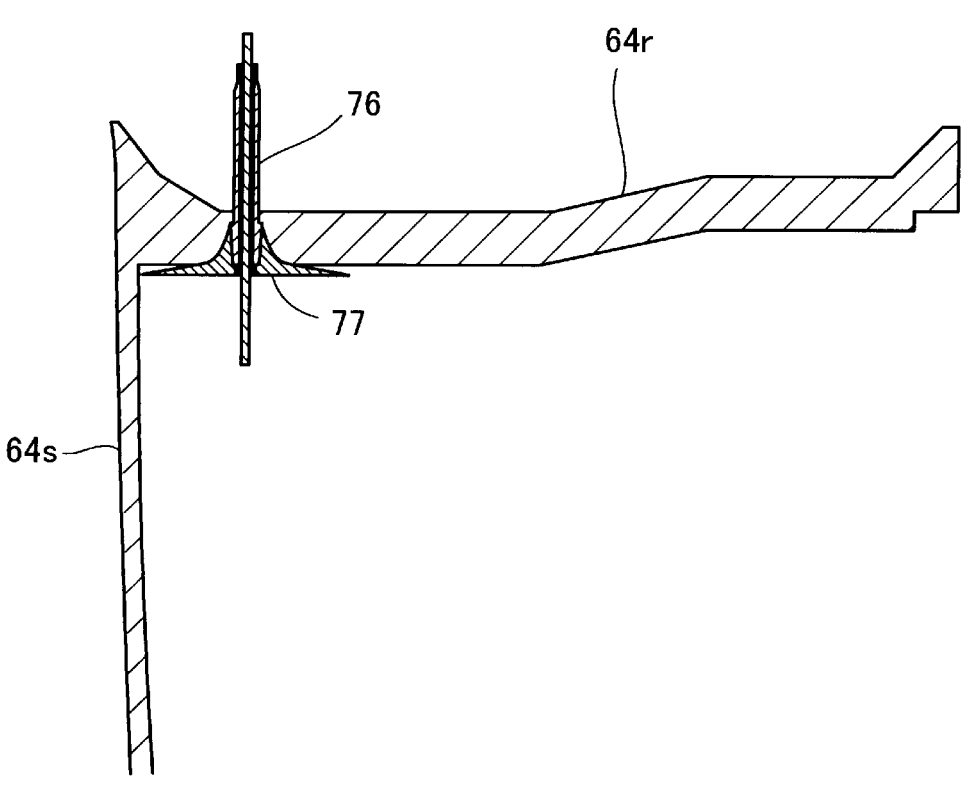
FIG. 35 is an explanatory diagram illustrating a variation of the position of a valve in the wheel.
Figure 36:
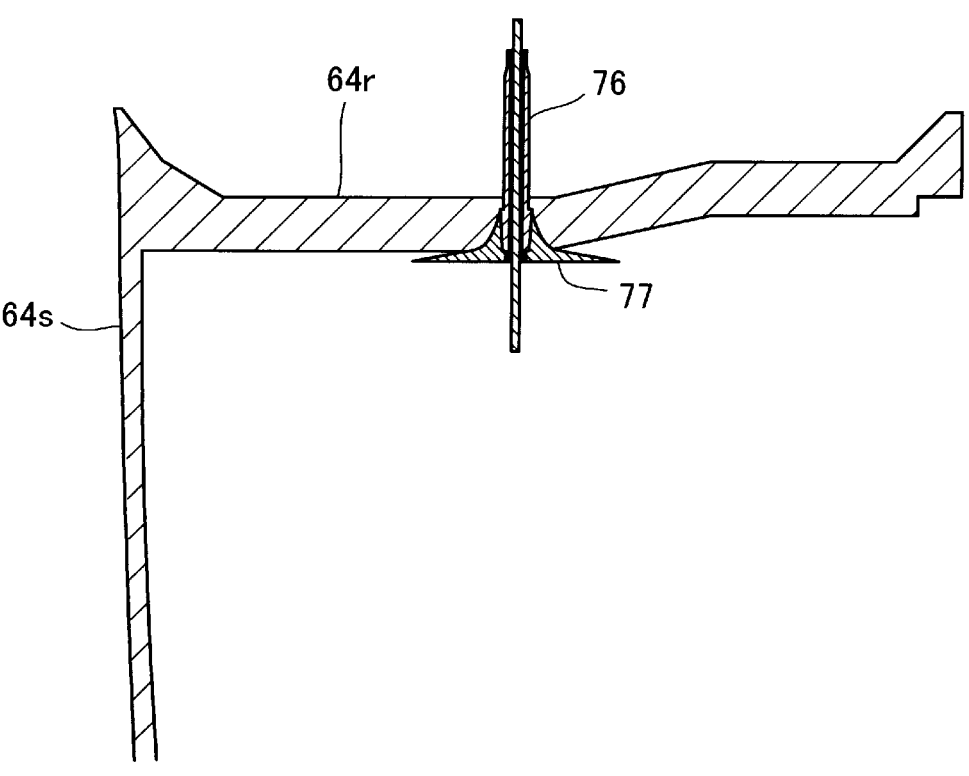
FIG. 36 is an explanatory diagram illustrating another variation of the position of the valve in the wheel.
Figure 37:
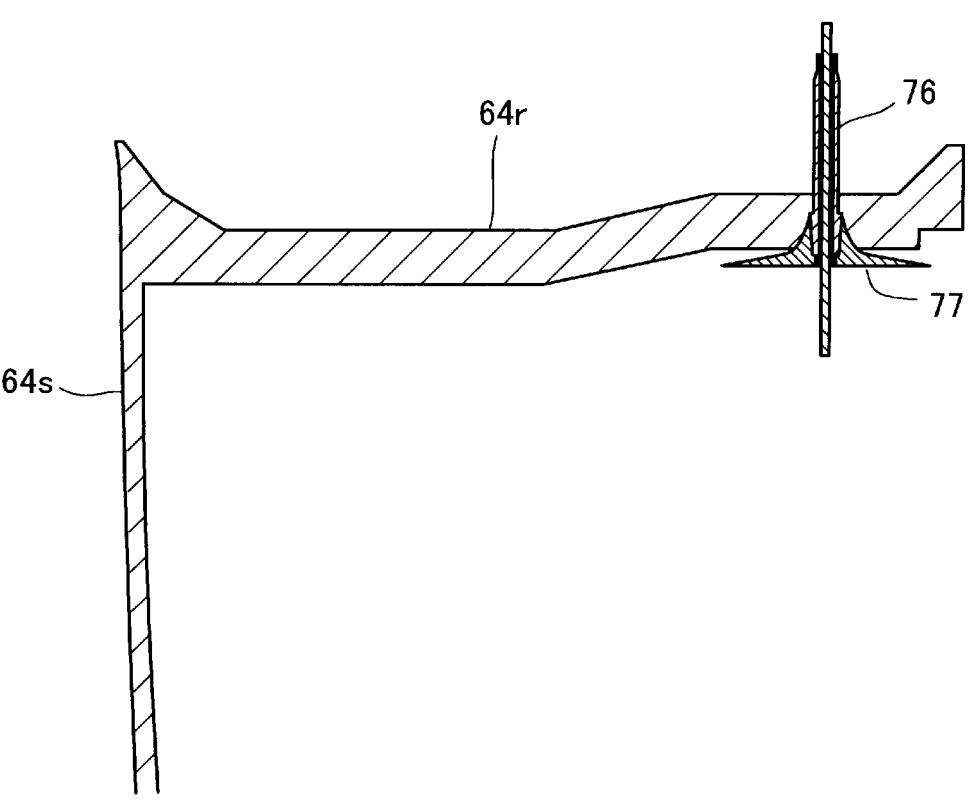
FIG. 37 is an explanatory diagram illustrating yet another variation of the position of the valve in the wheel.

FIGS. 35 to 37 are explanatory diagrams illustrating variations of the position of the valve 76 in the wheel 64. In the example illustrated in FIG. 35, the valve 76 is provided in a proximal end portion of the rim 64r of the wheel 64 near the spokes 64s. In contrast, in the example illustrated in FIG. 37, the valve 76 is provided in a distal end portion of the rim 64r of the wheel 64 far from the spokes 64s. In the example illustrated in FIG. 36, the valve 76 is provided substantially at the center of the rim 64r of the wheel 64. In the case of the valve 76 being provided at a position far from the spokes 64s, the spokes 64s are not in the working area and thus the workability is not affected by the spokes 64s; consequently, the assembly work of the internal member 80 is facilitated. On the other hand, in the case of providing the valve 76, the through-hole 65 is formed in the rim 64r of the wheel 64. The closer the through-hole 65 is formed to the spokes 64s, the more the strength of the through-hole 65 is reinforced by the spokes 64s. Accordingly, in terms of the strength, it is preferable to form the through-hole 65 at a position near the spokes 64s.

Second Embodiment

Figure 38:
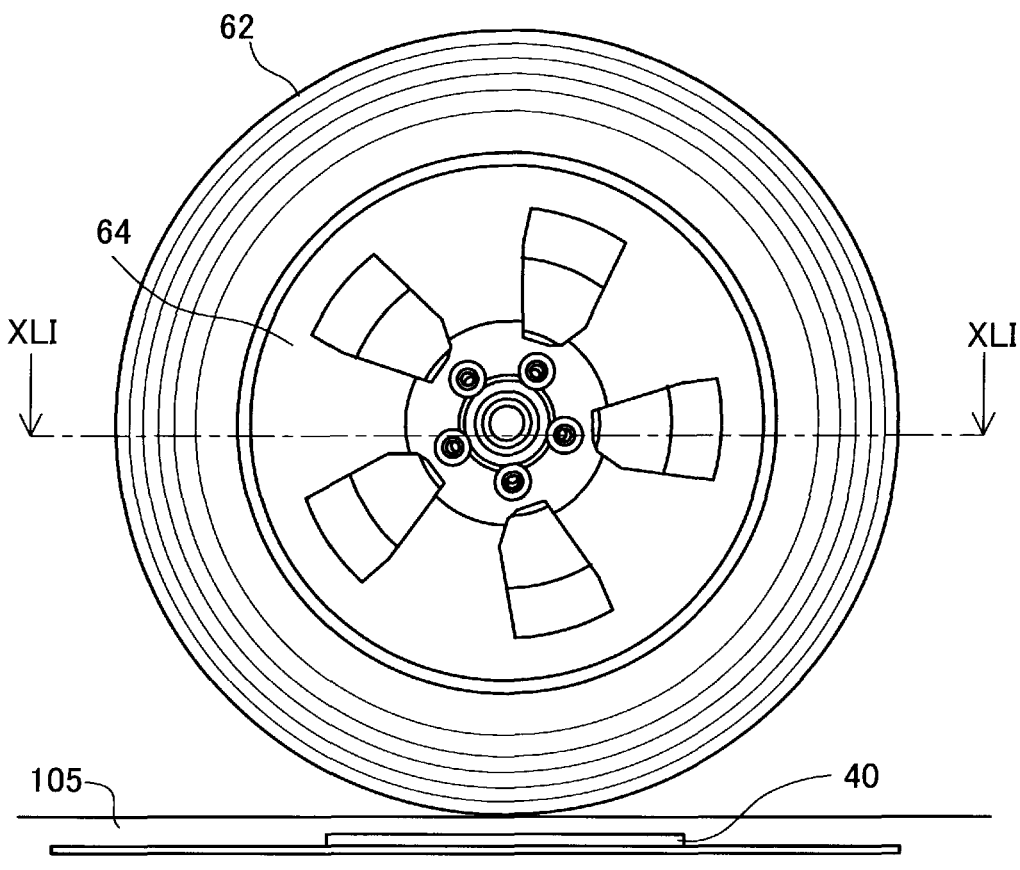
FIG. 38 is a view, from the outside of a vehicle, of a tired wheel employed in a second embodiment.
Figure 39:
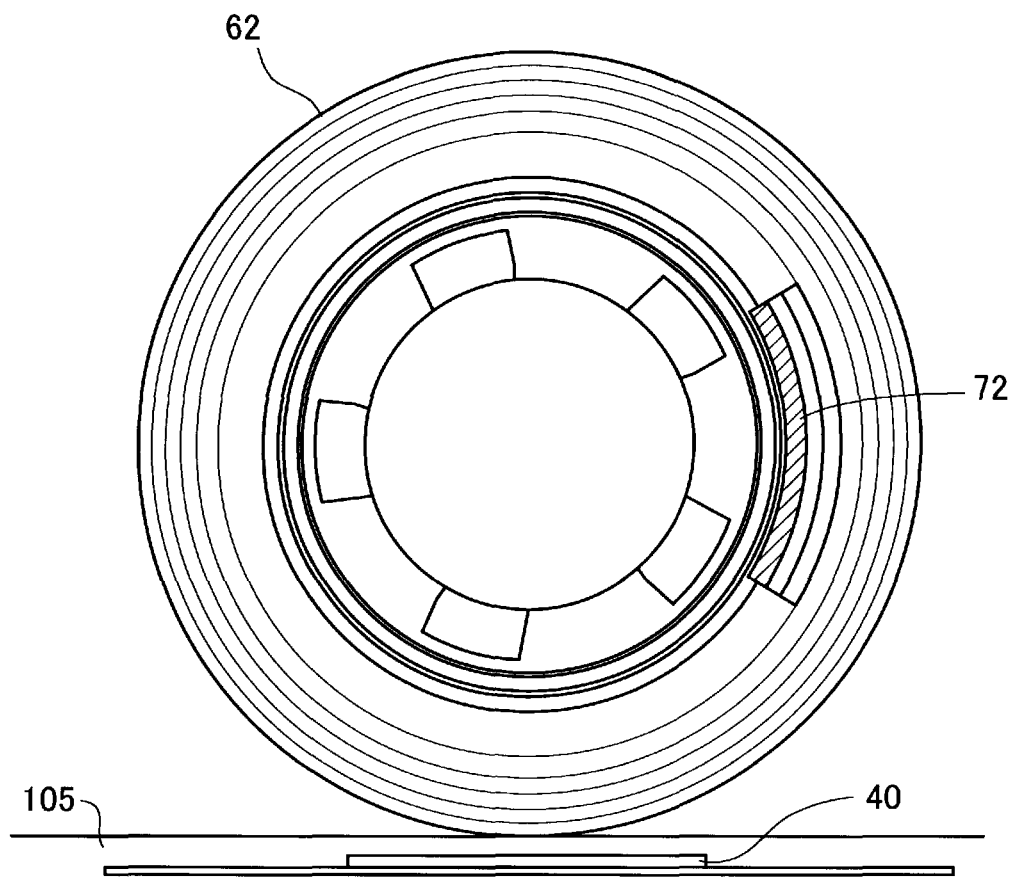
FIG. 39 is a view, from the vehicle side, the tired wheel employed in the second embodiment.
Figure 40:
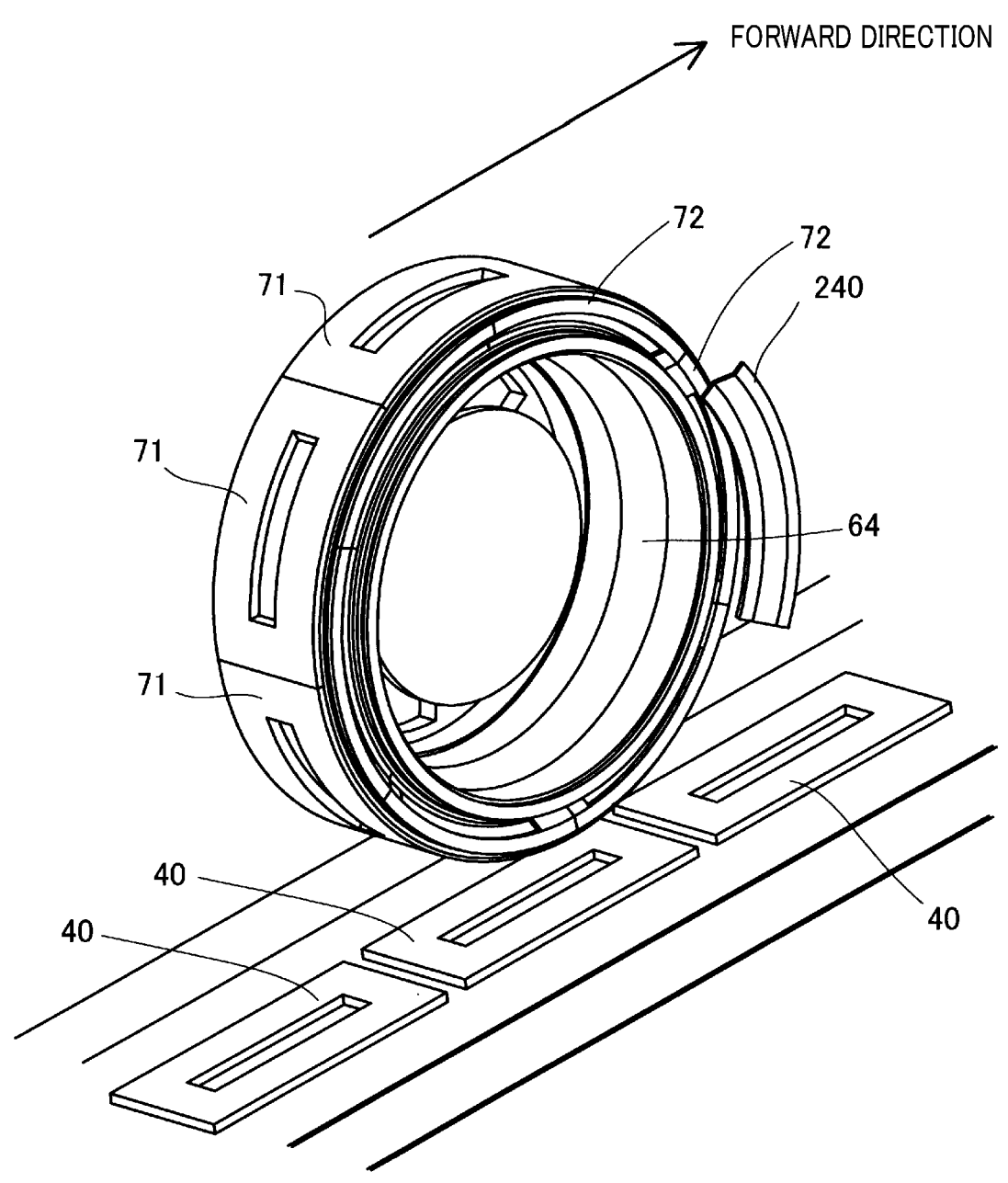
FIG. 40 is an explanatory diagram schematically illustrating the arrangement of power transmission coils, first coils, second coils and a power reception coil in the second embodiment.
Figure 41:
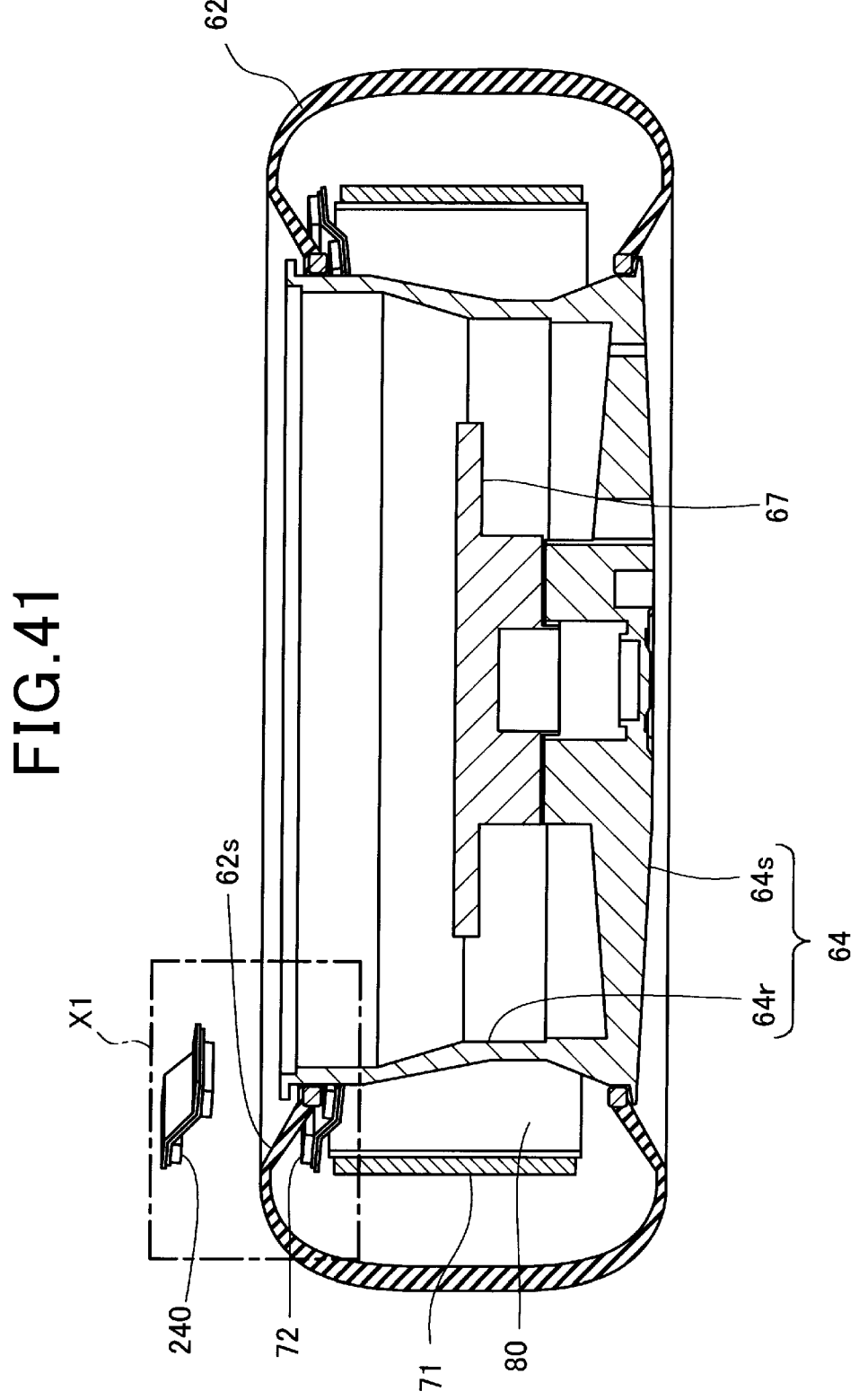
FIG. 41 is an explanatory diagram showing a cross section taken along the line XLI-XLI in FIG. 38.
Figure 42:
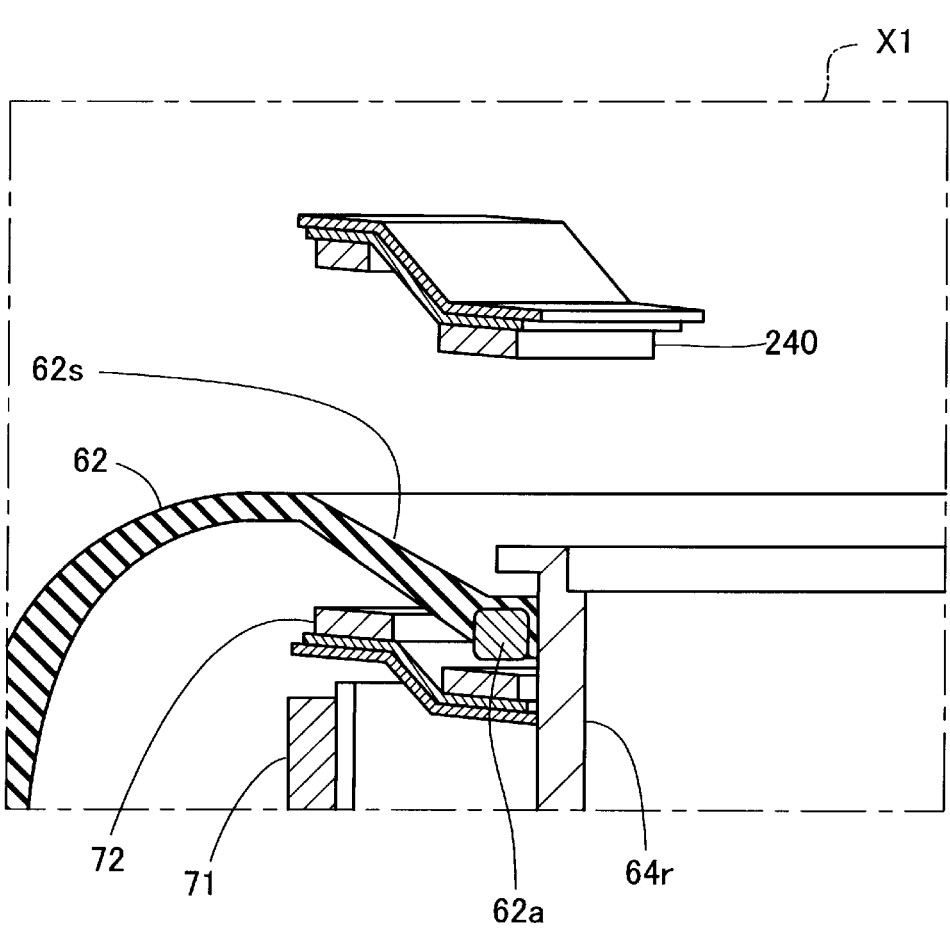
FIG. 42 is an enlarged view of a region X1 of FIG. 41.

In the first embodiment, the power reception coil 240 is arranged inside the wheel 64. In contrast, in the second embodiment, the power reception coil 240 is arranged so as to face the sidewall 62s of the tire 62. FIG. 38 is a view, from the outside of the vehicle 200, of a tired wheel 60 employed in the second embodiment. FIG. 39 is a view, from the vehicle 200 side, the tired wheel 60 employed in the second embodiment. FIG. 40 is an explanatory diagram showing the power transmission coils 40, the first coils 71, the second coils 72 and the power reception coil 240 in the second embodiment. FIG. 41 is an explanatory diagram showing a cross section taken along the line XLI-XLI in FIG. 38. FIG. 42 is an enlarged view of a region X1 of FIG. 41.

In each of the relay coils 70 of the tired wheel 60 employed in the second embodiment, the first coil 71 is provided on the outer periphery of the internal member 80 as in the first embodiment. The second coil 72 is provided on a side surface of the internal member 80 excluding the inner and outer peripheries thereof, and at a position corresponding to the sidewall 62s of the tire 62. The power reception coil 240 is arranged at a position which corresponds to the sidewall 62s of the tire 62 and where the power reception coil 240 faces, when the first coil 71 comes to a position where it faces one of the transmission coils 40, the second coil 72 corresponding to the first coil 71.

According to the second embodiment, both the interval between the power transmission coil 40 and the first coil 71 and the interval between the second coil 72 and the power reception coil 240 can be set to be narrow. Therefore, in the second embodiment, it is possible to achieve the same advantageous effects as achievable in the first embodiment, such as the effect of improving the efficiency of electric power transfer from the power transmission coil 40 to the power reception coil 240.

Moreover, according to the second embodiment, both the first coil 71 and the second coil 72 can be arranged in the internal member 80; thus, both the first coil 71 and the second coil 72 can be installed at the same time by placing the internal member 80 between the tire 62 and the wheel 64. Furthermore, since both the first coil 71 and the second coil 72 are arranged inside the tire 62, it is unnecessary to form a through-hole in the tire 62 or in the wheel 64. As a result, it becomes possible to improve airtightness of the tire 62.

Third Embodiment

Figure 43:
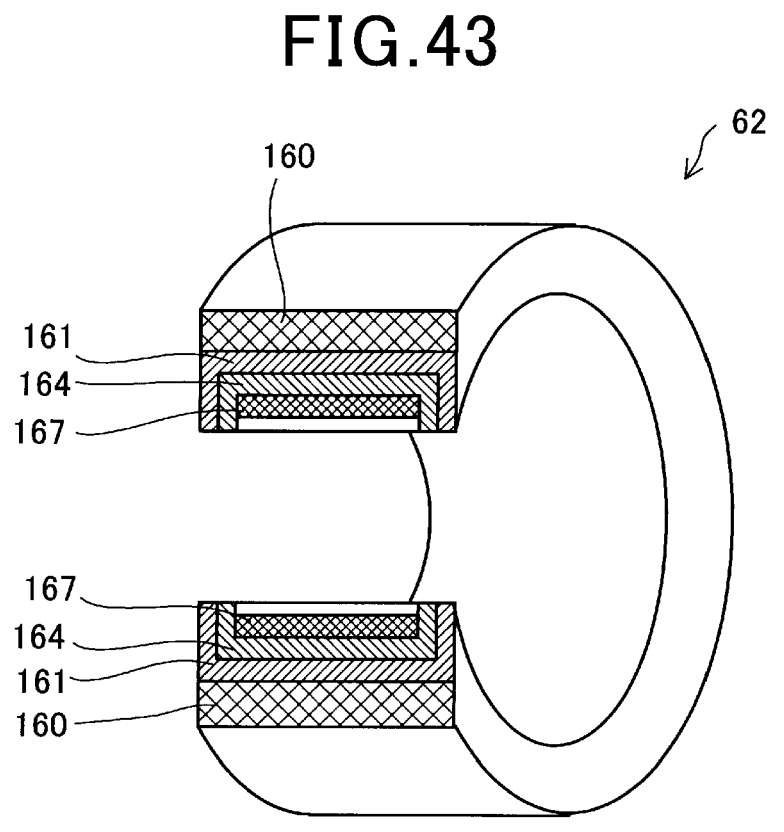

In the first and second embodiments, the first coil 71 is provided in the internal member 80. In contrast, in the third embodiment, the first coil 71 is formed of metal belts of the tire 62. FIG. 43 is an explanatory diagram schematically illustrating the configuration of the tire 62. As shown in FIG. 43, the tire 62 includes a tread 160, a first layer 161, a second layer 164 and a ferrite layer 167 that are arranged in this order from the outer peripheral side. The tread 160 is that part of the tire 62 which makes contact with the road 105. The tread 160 is formed of a rubber. The first layer 161 and the second layer 164 include the metal belts for reinforcing the tire 62 and suppressing deformation of the tire 62. In the third embodiment, the metal belts are used to form the first coil 71, as will be described later. In the example illustrated in FIG. 43, only two layers of the tire 62 include the metal belts; however, the tire 62 may have three or more layers that include metal belts. The ferrite layer 167 is used to enhance magnetic flux of the first coil 71 that is formed of the metal belts. It should be noted that the ferrite layer 167 may be omitted from the tire 62.

Figure 44A:
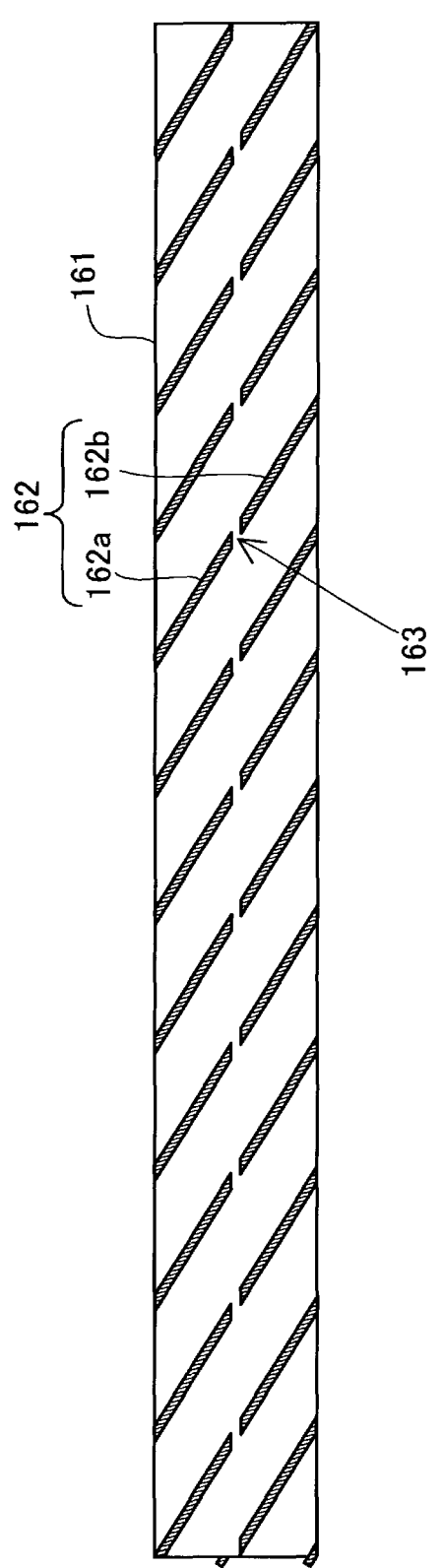
FIG. 44A is an explanatory diagram showing a first layer of a tire employed in a third embodiment.
Figure 44B:
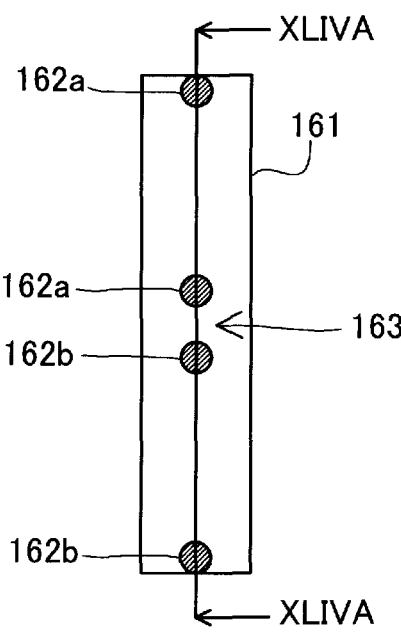
FIG. 44B is an explanatory diagram showing an end surface of the first layer.
Figure 45A:
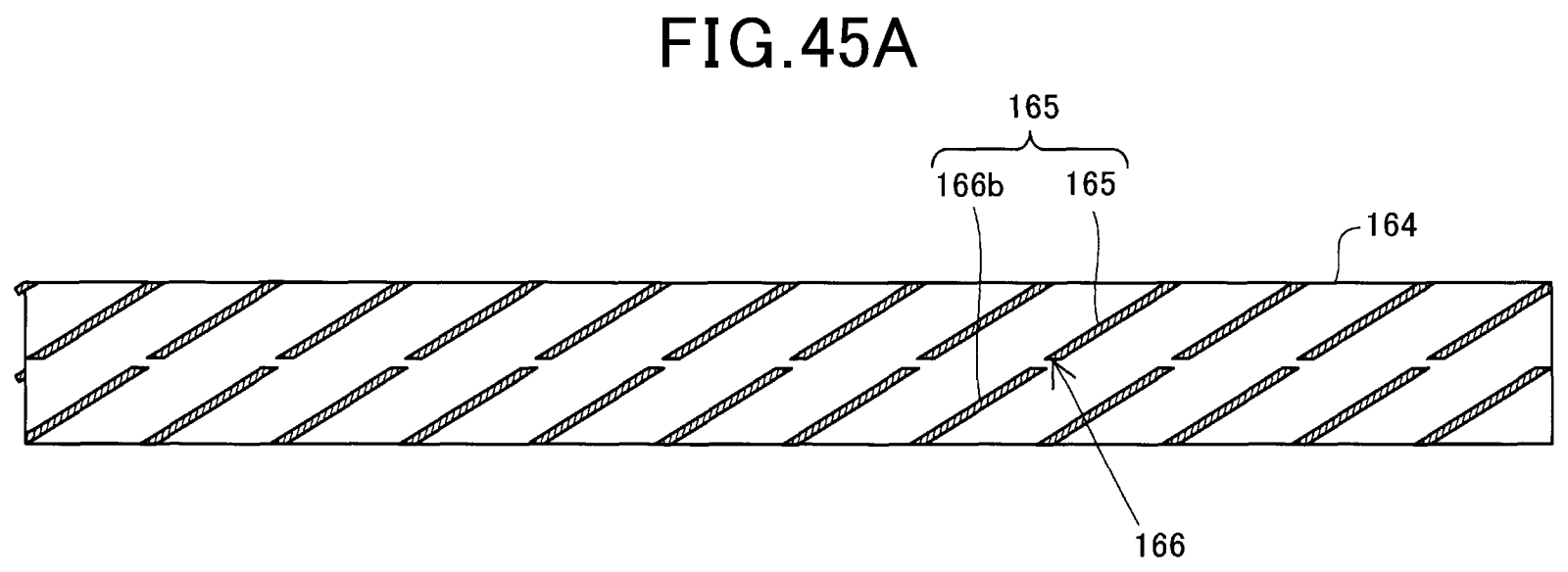
Figure 45B:
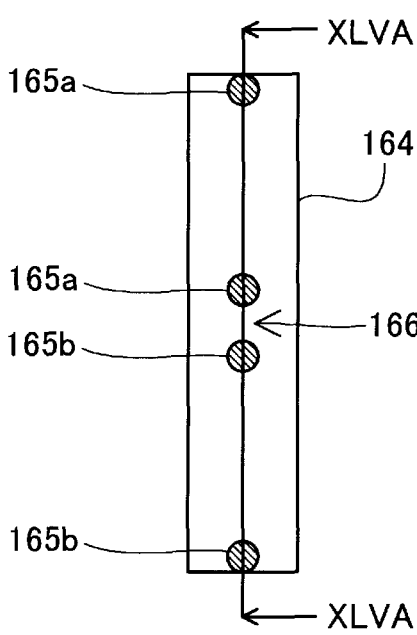
FIG. 45B is an explanatory diagram showing an end surface of the second layer.

FIG. 44A is an explanatory diagram showing the first layer 161 of the tire 62. FIG. 44B is an explanatory diagram showing an end surface of the first layer 161. As shown in FIGS. 44A and 44B, the first layer 161 includes metal wires 162a and 162b that are cut and separated at a central portion 163 of the first layer 161 in a lateral direction thereof. FIG. 45A is an explanatory diagram showing the second layer 164 of the tire 62. FIG. 45B is an explanatory diagram showing an end surface of the second layer 164. As shown in FIGS. 45A and 45B, the second layer 164 includes metal wires 165a and 165b that are cut and separated at a central portion 166 of the second layer 164 in a lateral direction thereof. The metal wires 162a and 162b of the first layer 161 and the metal wires 165a and 165b of the second layer 164 are located at mutually twisted positions, and function as the metal belts of the tire 62.

Figure 46A:
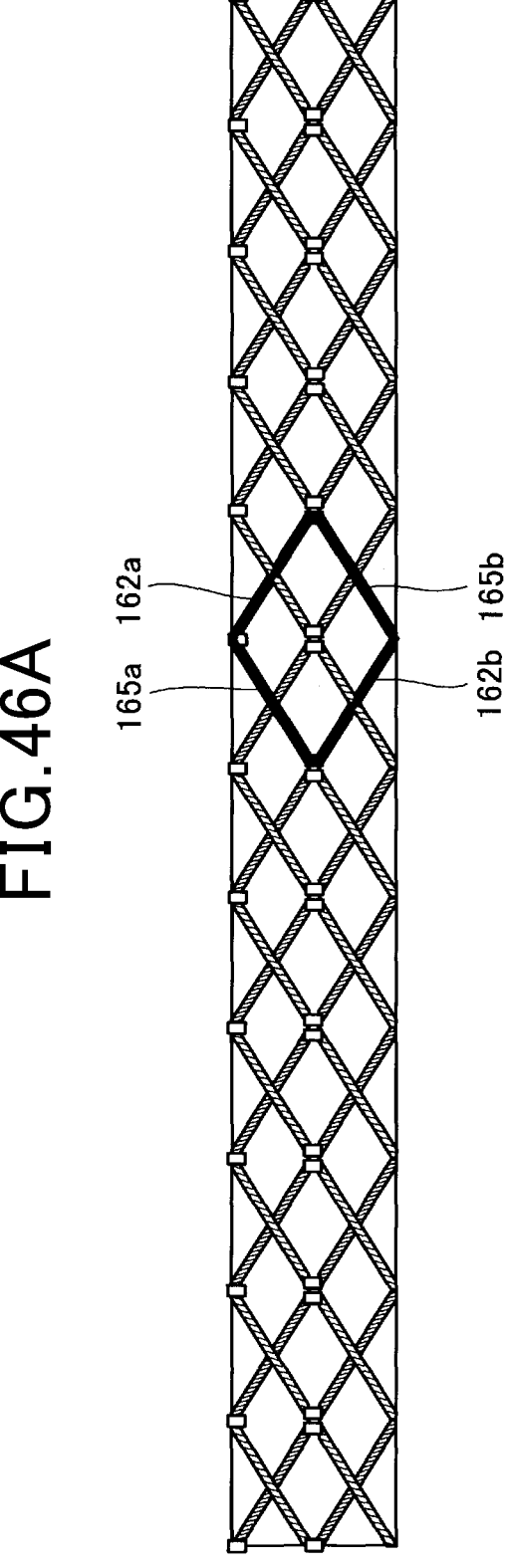
FIG. 46A is an explanatory diagram showing a state in which the first and second layers of the tire are overlapped on a ferrite layer.
Figure 46B:
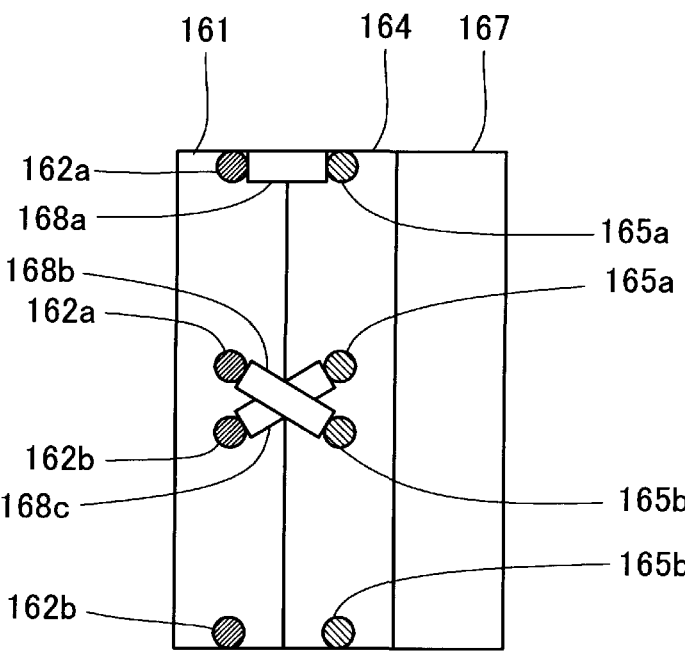
FIG. 46B is an explanatory diagram showing the end surfaces of the overlapped first and second layers of the tire.

FIG. 46A is an explanatory diagram showing a state in which the first and second layers 161 and 164 of the tire 62 are overlapped on the ferrite layer 167. FIG. 46B is an explanatory diagram showing the end surfaces of the overlapped first and second layers 161 and 164 of the tire 62. After the first layer 161 and the second layer 164 are overlapped, the metal wires 162a and 162b of the first layer 161 and the metal wires 165a and 165b of the second layer 164 are joined together into a single wire that forms the first coil 71.

As described above, according to the third embodiment, the first coil 71 is formed of the metal belts (i.e., the metal wires 162a, 162b, 165a and 165b) of the tire 62. Consequently, it becomes unnecessary to manufacture the first coil 71 separately.

Moreover, according to the third embodiment, since the first coil 71 is formed of the metal belts (i.e., the metal wires 162a, 162b, 165a and 165b) of the tire 62, the interval between the power transmission coil 40 and the first coil 71 can be narrowed, thereby improving the efficiency of electric power transfer from the power transmission coil 40 to the first coil 71.

In addition, according to the third embodiment, the first coil 71 is formed in the tire 62 and the internal member 80 is not employed. Therefore, the tire 62 can be easily replaced.

OTHER EMBODIMENTS

Figure 47:
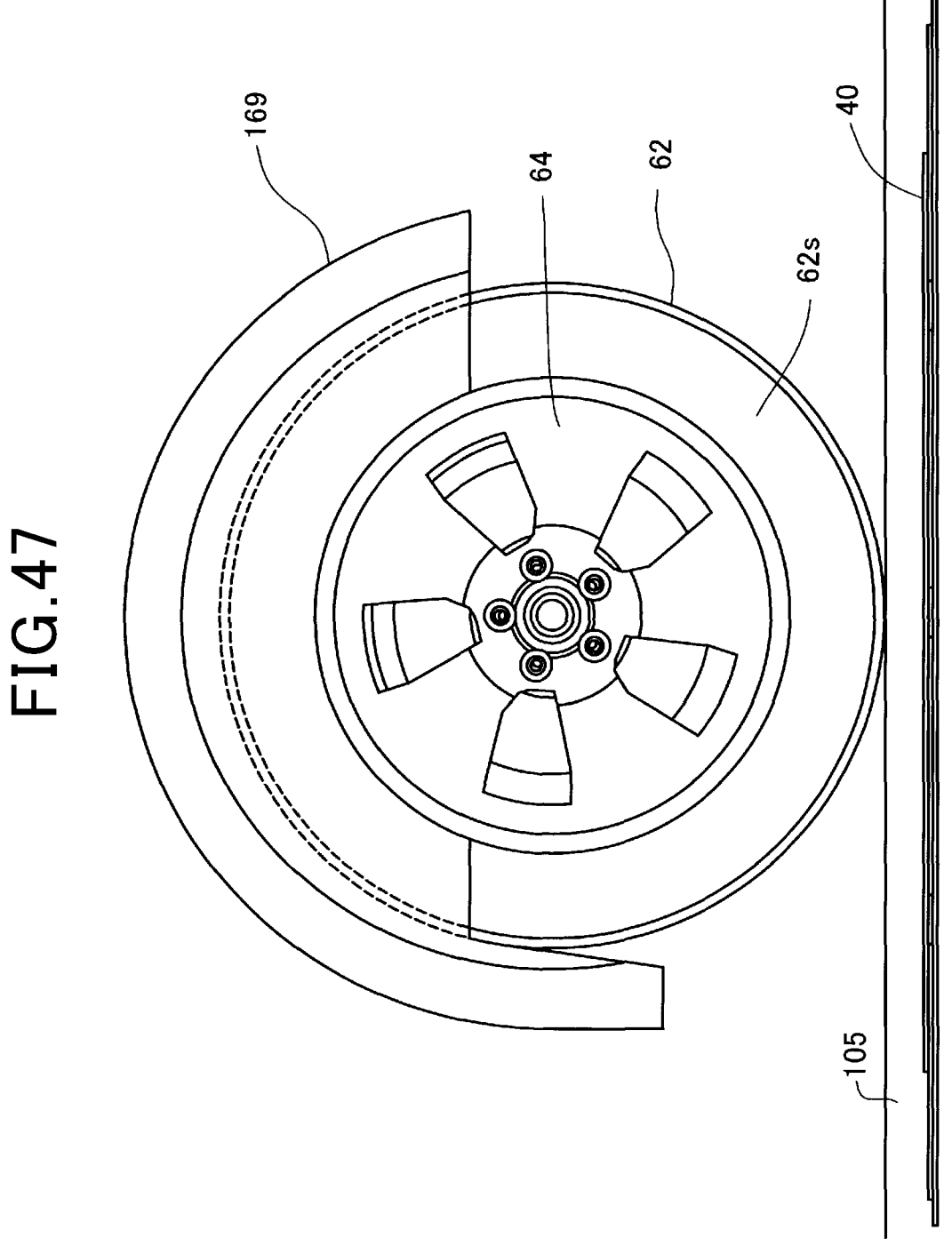
FIG. 47 is an explanatory diagram showing a fender cover in a third reference example.
Figure 48:
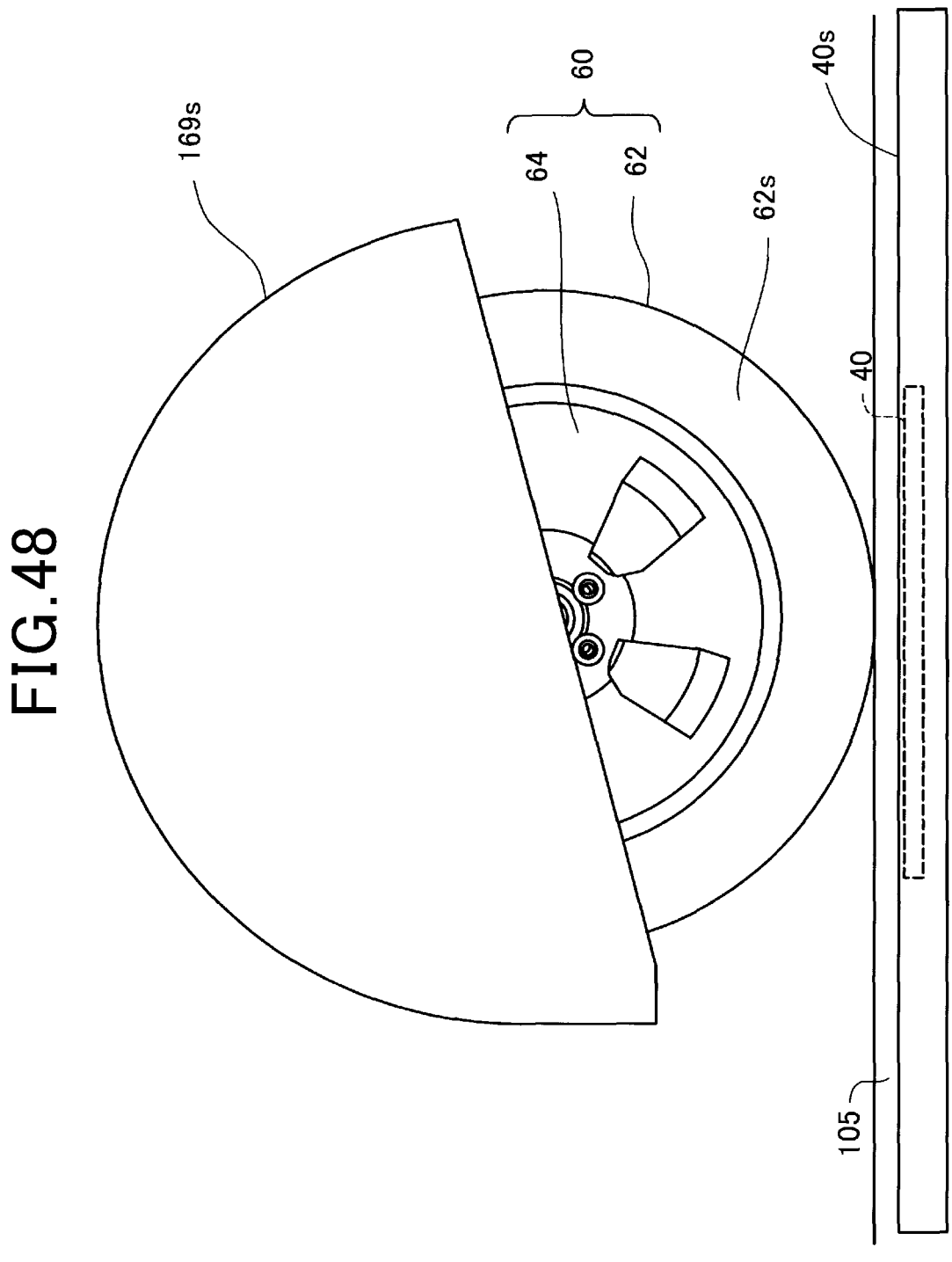
FIG. 48 is an explanatory diagram showing a fender cover (rear wheel skirt) in another embodiment.

FIG. 47 is an explanatory diagram showing a fender cover 169 in a third reference example. The fender cover 169, which is also called a skirt, covers the tire 62. FIG. 48 is an explanatory diagram showing a fender cover 169s in another embodiment. The fender cover 169s covers substantially half of the tired wheel 60. The fender cover 169s may be formed of, for example, a metal and can block leakage of the electromagnetic field generated by the relay coils 70. It is preferable for the fender cover 169s to cover the power reception coil 240 as well. In addition, leakage of the electromagnetic field can be blocked also by attaching a thin film of aluminum to the sidewall 62s of the tire 62 and/or arranging a shield 40s around the power transmission coils 40 in the road 105.

Moreover, since the fender cover 169s covers substantially half of the tired wheel 60, air resistance can be reduced.

In the above-described embodiments, each tired wheel 60 has six relay coils 70 arranged along the circumferential direction thereof. However, each tired wheel 60 may have two or more relay coils 70 arranged along the circumferential direction thereof; and the number of the relay coils 70 may be different from six.

In the above-described embodiments, the power transmission coils 40 are embedded in the road 105. However, the power transmission coils 40 may be embedded in other areas than the road 105, such as in the ground of a parking lot.

In the above-described embodiments, each of the relay coils 70 includes the resonant capacitor 74. However, the resonant capacitor 74 may be omitted from the configuration of each of the relay coils 70. In this case, it is possible to cause the first and second coils 71 and 72 to resonate as open coils using parasitic capacitances of the first and second coils 71 and 72.

The present disclosure is not limited to the above-described embodiments, but can be implemented in various configurations without departing from the gist of the present disclosure. For example, technical features of the embodiments may be replaced or combined as appropriate for solving some or all of the above-described problems or for achieving some or all of the above-described advantageous effects. Moreover, the technical features may be removed as appropriate unless they are specified as essential in the present specification.

What is claimed is:

1. A power reception apparatus installable in a vehicle and configured to receive electric power from a power transmission coil embedded in the ground,
the power reception apparatus comprising:
a power reception coil;
a plurality of relay coils arranged on a tired wheel, which includes a tire and a wheel, the plurality of relay coils configured to relay transfer of electric power from the power transmission coil to the power reception coil; and
a power reception circuit connected with the power reception coil,
wherein:
each of the plurality of relay coils includes a first coil and a second coil that are connected with each other by an electrical conductor;
each of the first coils is arranged inside the tire;
for each of the relay coils, the second coil is arranged at a position such that a distance from a central axis of the tired wheel to the second coil is shorter than a distance from the central axis of the tired wheel to the first coil; and
the power reception coil is arranged at a position such that, for each of the relay coils, when the first coil faces the power transmission coil, the power reception coil faces the second coil.

2. The power reception apparatus as set forth in claim 1, wherein, for each of the relay coils:
the first coil is arranged on an outer side of a rim of the wheel; and
the second coil is arranged on an inner side of the rim.

3. The power reception apparatus as set forth in claim 1, wherein, for each of the relay coils:
the first and second coils are located so that they overlap each other; and
when viewed along an axis passing through both the first and second coils, a direction of electric current flowing through the first coil and a direction of electric current flowing through the second coil are opposite to each other.

4. The power reception apparatus as set forth in claim 1, wherein:
each of the second coils is arranged outside the tire; and
the tire or the wheel has a through-hole through which the electrical conductor extends.

5. The power reception apparatus as set forth in claim 4, wherein the through-hole is hermetically sealed, with the electrical conductor extending through the through-hole.

6. The power reception apparatus as set forth in claim 4, wherein the electrical conductor is formed of a litz wire or a busbar.

7. The power reception apparatus as set forth in claim 1, wherein the plurality of relay coils are arranged along a circumferential direction of the tired wheel.

8. The power reception apparatus as set forth in claim 1, wherein the power reception coil is arranged inside the wheel.

9. The power reception apparatus as set forth in claim 1, wherein, for each of the relay coils, the first coil is connected with a resonant capacitor for resonating, with respect to an inductance value of the first coil when the first coil faces the power transmission coil, at a resonant frequency of the power transmission coil.

10. The power reception apparatus as set forth in claim 9, wherein the resonant capacitor is held inside the wheel.

11. The power reception apparatus as set forth in claim 4, wherein, for each of the relay coils, the first coil is connected with a resonant capacitor for resonating, with respect to an inductance value of the first coil when the first coil faces the power transmission coil, at a resonant frequency of the power transmission coil.

12. The power reception apparatus as set forth in claim 11, wherein the resonant capacitor is arranged in the through-hole which is formed in the wheel and through which the electrical conductor extends.

13. The power reception apparatus as set forth in claim 1, wherein each of the first coils and the wheel are connected with each other by a thermally-conductive member having a higher thermal conductivity than air in the tire.

14. The power reception apparatus as set forth in claim 1, wherein each of the first coils is formed of a metal belt employed in the tire.

15. The power reception apparatus as set forth in claim 1, wherein each of the plurality of relay coils is located away from the central axis of the tired wheel.

* * * * *